US012377006B2

(12) United States Patent
Hollabaugh et al.

(10) Patent No.: US 12,377,006 B2
(45) Date of Patent: Aug. 5, 2025

(54) SYSTEMS AND METHODS FOR LIFTING AND POSITIONING A PATIENT

(71) Applicant: Sage Products, LLC, Cary, IL (US)

(72) Inventors: Curtis L. Hollabaugh, Cary, IL (US); Michael P. Flores, Cary, IL (US); Daniel R. Ulreich, Cary, IL (US); Corey A. Bochat, Crystal Lake, IL (US)

(73) Assignee: Sage Products, LLC, Cary, IL (US)

( * ) Notice: Subject to any disclaimer, the term of this patent is extended or adjusted under 35 U.S.C. 154(b) by 0 days.

(21) Appl. No.: 17/741,042

(22) Filed: May 10, 2022

(65) Prior Publication Data

US 2022/0265497 A1 Aug. 25, 2022

Related U.S. Application Data

(62) Division of application No. 16/547,343, filed on Aug. 21, 2019, now Pat. No. 11,324,652.

(Continued)

(51) Int. Cl.
*A61G 7/10* (2006.01)
*A61G 7/057* (2006.01)

(52) U.S. Cl.
CPC ....... *A61G 7/1051* (2013.01); *A61G 7/05769* (2013.01); *A61G 7/1021* (2013.01);

(Continued)

(58) Field of Classification Search
CPC .............. A61G 7/1051; A61G 7/05769; A61G 7/1021; A61G 7/1074; A61G 2200/32; A61G 2203/70; A61G 7/1078; A61G 7/1061; A61G 7/1017; A61G 7/05776; A61G 7/1015; A61G 7/1026; A61G 7/10; A61G 7/1023; A61G 7/001; A61G 7/1028; A61G 1/044; A61G 1/048; A61G 13/1265;

(Continued)

(56) References Cited

U.S. PATENT DOCUMENTS 542,720 A 7/1895 Weiss
674,451 A 5/1901 Bunker (Continued)

FOREIGN PATENT DOCUMENTS

AU 2008256995 A1 * 11/2009 ............. A61G 1/013
CN 208259823 U 12/2018

(Continued)

OTHER PUBLICATIONS

Church et al., hereinafter 'Church' (NPL—Burn Wound Infection), Clinical Microbiology Reviews, Apr. 2006, p. 403-434 (Year: 2006).*

(Continued)

*Primary Examiner* — Madison Emanski
(74) *Attorney, Agent, or Firm* — FOLEY & LARDNER LLP

(57) ABSTRACT

An inflatable device for lifting a patient includes an inflatable body having a top sheet and a bottom sheet attached along opposing side edges and forming at least one cavity there between, and a plurality of connecting members extending outwardly from the opposing side edges of the inflatable device. The inflatable device is configured to be inflated while being lifted by the hoist.

20 Claims, 26 Drawing Sheets

Related U.S. Application Data

(60) Provisional application No. 62/720,768, filed on Aug. 21, 2018.

(52) U.S. Cl.
CPC ........ *A61G 7/1074* (2013.01); *A61G 2200/32* (2013.01); *A61G 2203/70* (2013.01)

(58) Field of Classification Search
CPC ........... A61G 13/1275; A61G 7/05753; A61G 7/0504; A61G 2200/34; A61G 1/01; A61G 7/103; A61G 7/1055; A47C 17/84; A47C 4/54; A47C 15/006; A47C 27/08; A45F 3/22; Y10S 5/926; A61F 2013/15154
USPC ...... 5/89.1, 706, 81.1 R, 81.1 HS, 83.1, 625, 5/81.1 T, 710, 713, 628; 128/870
See application file for complete search history.

(56) References Cited

U.S. PATENT DOCUMENTS

| | | | | |
|---|---|---|---|---|
| 1,334,901 | A | | 3/1920 | Higdon |
| 1,726,939 | A | | 9/1929 | Anderson |
| 2,068,134 | A | | 1/1937 | Houghton |
| 2,573,375 | A | | 10/1951 | Winstead |
| 2,582,439 | A | | 1/1952 | Kavanagh |
| 2,750,606 | A | | 6/1956 | Freedlander et al. |
| 2,804,911 | A | | 9/1957 | Howarth |
| D195,020 | S | | 4/1963 | Emery |
| 3,112,956 | A | | 12/1963 | Shick et al. |
| 3,155,991 | A | | 11/1964 | Dunham |
| 3,166,799 | A | | 1/1965 | Milton |
| 3,178,732 | A | | 4/1965 | Stibitz |
| 3,205,010 | A | | 9/1965 | Schick |
| 3,325,832 | A | | 6/1967 | Malicki |
| 3,333,286 | A | | 8/1967 | Biolik |
| 3,452,372 | A | | 7/1969 | Emery |
| 3,474,781 | A | | 10/1969 | Gaylord, Jr. |
| 3,477,071 | A | | 11/1969 | Emerson |
| 3,503,649 | A | | 3/1970 | Johnson |
| 3,523,563 | A | | 8/1970 | Mirando |
| 3,536,117 | A | | 10/1970 | Huber |
| 3,653,083 | A | | 4/1972 | Lapidus |
| 3,778,851 | A | | 12/1973 | Howorth |
| 3,785,395 | A | | 1/1974 | Andreasson |
| 3,829,914 | A | | 8/1974 | Treat |
| 3,933,154 | A | | 1/1976 | Cabansag |
| 3,965,503 | A | | 6/1976 | Gridel |
| 4,030,719 | A | | 6/1977 | Gabriele et al. |
| 4,048,681 | A | | 9/1977 | Baulch et al. |
| 4,066,072 | A | | 1/1978 | Cummins |
| 4,073,021 | A | | 2/1978 | Carlisle |
| 4,108,170 | A | | 8/1978 | Spann |
| 4,132,228 | A | | 1/1979 | Green |
| 4,214,326 | A | | 7/1980 | Spann |
| 4,233,700 | A | | 11/1980 | Spann |
| 4,247,963 | A | | 2/1981 | Reddi |
| 4,272,856 | A | | 6/1981 | Wegener et al. |
| 4,370,769 | A | | 2/1983 | Herzig et al. |
| 4,389,742 | A | | 6/1983 | Dewitt |
| 4,391,010 | A | | 7/1983 | Kronman |
| 4,417,710 | A | | 11/1983 | Adair |
| 4,425,676 | A | | 1/1984 | Crane |
| 4,509,214 | A | | 4/1985 | Shea |
| 4,517,690 | A | | 5/1985 | Wegener |
| 4,528,704 | A | | 7/1985 | Wegener et al. |
| 4,554,693 | A | | 11/1985 | Calloway |
| 4,627,426 | A | | 12/1986 | Wegener et al. |
| 4,627,796 | A | | 12/1986 | Moore |
| 4,662,016 | A | | 5/1987 | Seeman |
| 4,662,366 | A | | 5/1987 | Tari |
| 4,675,925 | A | | 6/1987 | Littleton |
| 4,686,719 | A | | 8/1987 | Johnson et al. |
| 4,694,515 | A | | 9/1987 | Rogers, Jr. |
| 4,802,249 | A | | 2/1989 | Bills |
| 4,809,484 | A | | 3/1989 | Lovik |
| 4,823,417 | A | | 4/1989 | Fukuichi |
| 4,858,625 | A | | 8/1989 | Cramer |
| 4,867,230 | A | | 9/1989 | Voss |
| 4,905,712 | A | | 3/1990 | Bowlin et al. |
| 4,908,895 | A | | 3/1990 | Walker |
| 4,912,861 | A | | 4/1990 | Huang |
| 4,944,053 | A | | 7/1990 | Smith |
| 4,977,629 | A | | 12/1990 | Jones |
| 5,012,821 | A | | 5/1991 | Tarver |
| 5,016,650 | A | | 5/1991 | Marlar |
| 5,022,110 | A | | 6/1991 | Stroh |
| 5,056,533 | A | | 10/1991 | Solano |
| 5,060,324 | A | * | 10/1991 | Marinberg .......... A61B 6/0442 5/81.1 T |
| 5,067,189 | A | | 11/1991 | Weedling et al. |
| 5,070,559 | A | | 12/1991 | Pettifer |
| 5,086,543 | A | | 2/1992 | Mitchell |
| 5,088,747 | A | | 2/1992 | Morrison et al. |
| 5,111,838 | A | | 5/1992 | Langston |
| 5,123,699 | A | | 6/1992 | Warburton |
| 5,138,731 | A | | 8/1992 | Harcrow, Jr. |
| 5,142,720 | A | | 9/1992 | Kelso et al. |
| 5,144,708 | A | | 9/1992 | Pekar |
| 5,148,563 | A | | 9/1992 | Klearman et al. |
| D331,270 | S | | 11/1992 | Johnson et al. |
| 5,168,589 | A | | 12/1992 | Stroh et al. |
| 5,182,828 | A | | 2/1993 | Alivizatos |
| 5,193,238 | A | | 3/1993 | Clute |
| 5,199,121 | A | | 4/1993 | Payne |
| 5,226,186 | A | | 7/1993 | Boyd |
| 5,280,657 | A | | 1/1994 | Stagg |
| 5,329,655 | A | | 7/1994 | Garner |
| 5,331,698 | A | | 7/1994 | Newkirk et al. |
| 5,362,302 | A | | 11/1994 | Jensen et al. |
| 5,369,829 | A | | 12/1994 | Jay |
| 5,373,595 | A | | 12/1994 | Johnson et al. |
| 5,390,384 | A | | 2/1995 | Dinsmoor et al. |
| 5,395,162 | A | | 3/1995 | Jay et al. |
| 5,398,678 | A | | 3/1995 | Gamow |
| 5,426,801 | A | | 6/1995 | Klearman et al. |
| 5,438,721 | A | | 8/1995 | Pahno et al. |
| 5,447,235 | A | | 9/1995 | Pharo |
| 5,448,790 | A | | 9/1995 | Saro et al. |
| 5,451,179 | A | | 9/1995 | Laroi, Jr. et al. |
| 5,452,487 | A | | 9/1995 | Leggett |
| 5,524,307 | A | | 6/1996 | Griffin |
| RE35,299 | E | | 7/1996 | Weedling et al. |
| 5,549,121 | A | | 8/1996 | Vinci |
| 5,561,873 | A | | 10/1996 | Weedling |
| 5,603,591 | A | | 2/1997 | Mclellan |
| RE35,468 | E | | 3/1997 | Newman |
| 5,632,769 | A | | 5/1997 | Kappel et al. |
| 5,634,224 | A | | 6/1997 | Stephen |
| 5,671,977 | A | | 9/1997 | Jay et al. |
| 5,702,153 | A | | 12/1997 | Pliska |
| 5,742,958 | A | | 4/1998 | Solazzo |
| 5,797,155 | A | | 8/1998 | Maier et al. |
| 5,806,928 | A | | 9/1998 | Gattuso et al. |
| 5,830,780 | A | | 11/1998 | Dennison et al. |
| 5,836,027 | A | | 11/1998 | Leventhal et al. |
| 5,836,654 | A | | 11/1998 | Debellis et al. |
| 5,957,491 | A | | 9/1999 | Cech et al. |
| 6,012,183 | A | | 1/2000 | Brooke et al. |
| 6,073,291 | A | | 6/2000 | Davis |
| 6,082,824 | A | | 7/2000 | Chow |
| 6,102,936 | A | | 8/2000 | Augustine et al. |
| 6,108,861 | A | | 8/2000 | Vystrcil et al. |
| 6,115,861 | A | | 9/2000 | Reeder et al. |
| 6,145,143 | A | | 11/2000 | Hicks et al. |
| 6,154,900 | A | | 12/2000 | Shaw |
| 6,159,172 | A | | 12/2000 | Gray et al. |
| 6,223,368 | B1 | | 5/2001 | Anslin |
| 6,223,369 | B1 | | 5/2001 | Maier et al. |
| 6,240,584 | B1 | | 6/2001 | Perez et al. |
| 6,241,320 | B1 | | 6/2001 | Chew et al. |
| 6,241,755 | B1 | | 6/2001 | Arnold et al. |

(56) References Cited

U.S. PATENT DOCUMENTS

| | | | | |
|---|---|---|---|---|
| 6,273,810 | B1 | 8/2001 | Rhodes et al. | |
| 6,317,909 | B1 | 11/2001 | Blum | |
| 6,327,724 | B1 | 12/2001 | Sharrock et al. | |
| 6,347,642 | B1 | 2/2002 | Schulte | |
| 6,357,084 | B1 | 3/2002 | Haidon | |
| 6,367,106 | B1 | 4/2002 | Gronsman | |
| 6,374,435 | B1 | 4/2002 | Leininger et al. | |
| 6,413,194 | B1 | 7/2002 | Gant | |
| 6,427,268 | B1 | 8/2002 | Davis | |
| 6,467,106 | B1 | 10/2002 | Heimbrock | |
| 6,484,334 | B1 | 11/2002 | Borders et al. | |
| 6,510,574 | B2 | 1/2003 | Sharrock et al. | |
| 6,541,094 | B1 | 4/2003 | Landvik et al. | |
| 6,543,068 | B1 | 4/2003 | Penninger | |
| 6,560,793 | B2 | 5/2003 | Walker | |
| 6,653,363 | B1 | 11/2003 | Tursi et al. | |
| 6,658,676 | B1 | 12/2003 | Persson et al. | |
| 6,666,426 | B1 | 12/2003 | Taylor | |
| 6,698,041 | B2 | 3/2004 | Vansteenburg et al. | |
| 6,701,544 | B2 | 3/2004 | Heimbrock | |
| 6,701,558 | B2 | 3/2004 | Vansteenburg | |
| 6,701,559 | B2 | 3/2004 | Boso et al. | |
| 6,804,845 | B2 | 10/2004 | Stewart et al. | |
| 6,820,292 | B2 | 11/2004 | Heimbrock | |
| 6,874,176 | B2 | 4/2005 | Berge | |
| 6,898,809 | B2 | 5/2005 | Davis | |
| D508,182 | S | 8/2005 | Colonello | |
| 6,964,073 | B1 * | 11/2005 | Curry | A61G 1/00 128/870 |
| 6,966,275 | B2 | 11/2005 | Whitehill | |
| 7,028,350 | B1 | 4/2006 | Davis | |
| 7,032,261 | B2 | 4/2006 | Heimbrock | |
| 7,040,706 | B2 | 5/2006 | Koffler | |
| 7,074,166 | B2 | 7/2006 | Weitzman | |
| 7,107,641 | B2 | 9/2006 | Davis | |
| 7,114,204 | B2 | 10/2006 | Patrick | |
| 7,131,154 | B2 | 11/2006 | Davis et al. | |
| 7,168,115 | B2 | 1/2007 | Davis | |
| 7,210,176 | B2 | 5/2007 | Weedling et al. | |
| 7,225,486 | B2 | 6/2007 | Jackson | |
| 7,240,384 | B2 | 7/2007 | Dudonis | |
| 7,243,382 | B2 | 7/2007 | Weedling et al. | |
| 7,266,852 | B2 | 9/2007 | Davis | |
| 7,337,485 | B2 | 3/2008 | Metzger | |
| 7,340,785 | B2 | 3/2008 | Weedling et al. | |
| 7,373,680 | B2 | 5/2008 | Davis | |
| 7,376,995 | B2 | 5/2008 | Davis | |
| 7,406,723 | B2 | 8/2008 | Davis | |
| 7,415,738 | B2 | 8/2008 | Weedling et al. | |
| 7,467,431 | B2 | 12/2008 | Weedling et al. | |
| 7,506,387 | B1 | 3/2009 | Scordato et al. | |
| 7,565,709 | B2 | 7/2009 | Davis | |
| 7,571,498 | B2 | 8/2009 | Jewell et al. | |
| 7,574,761 | B2 | 8/2009 | Davis | |
| 7,591,029 | B2 | 9/2009 | Weedling et al. | |
| 7,627,910 | B2 | 12/2009 | Davis | |
| 7,650,654 | B2 | 1/2010 | Lambarth et al. | |
| 7,676,862 | B2 | 3/2010 | Poulos et al. | |
| 7,681,262 | B2 | 3/2010 | Weedling et al. | |
| 7,712,170 | B2 | 5/2010 | Davis | |
| 7,731,282 | B2 | 6/2010 | Leeds | |
| 7,731,283 | B2 | 6/2010 | Leeds | |
| 7,735,164 | B1 | 6/2010 | Patrick | |
| 7,739,758 | B2 | 6/2010 | Weedling et al. | |
| 7,757,318 | B2 | 7/2010 | Poulos et al. | |
| 7,784,132 | B2 | 8/2010 | Gonzalez et al. | |
| 7,810,193 | B1 | 10/2010 | Ennis et al. | |
| 7,900,299 | B2 | 3/2011 | Weedling et al. | |
| 7,914,081 | B1 | 3/2011 | Smith | |
| 7,914,611 | B2 | 3/2011 | Vrzalik et al. | |
| 7,954,187 | B1 | 6/2011 | Earnest | |
| 8,001,635 | B2 | 8/2011 | Humbles | |
| 8,118,920 | B2 | 2/2012 | Vrzalik | |
| 8,127,382 | B1 | 3/2012 | Plascencia et al. | |
| 8,128,065 | B2 | 3/2012 | King et al. | |
| 8,161,583 | B1 | 4/2012 | Palen | |
| 8,214,951 | B1 | 7/2012 | Batta | |
| 8,234,727 | B2 | 8/2012 | Schreiber et al. | |
| 8,276,222 | B1 | 10/2012 | Patrick | |
| 8,302,222 | B2 | 11/2012 | Jasani | |
| 8,353,069 | B1 | 1/2013 | Miller | |
| 8,372,182 | B2 | 2/2013 | Vrzalik et al. | |
| 8,387,177 | B2 | 3/2013 | Davis | |
| 8,413,277 | B2 | 4/2013 | Davis et al. | |
| 8,464,376 | B1 | 6/2013 | Waite | |
| 8,464,720 | B1 | 6/2013 | Pigazzi et al. | |
| 8,511,314 | B2 | 8/2013 | Pigazzi et al. | |
| 8,539,621 | B2 | 9/2013 | West | |
| 8,539,622 | B2 | 9/2013 | West | |
| 8,539,623 | B2 | 9/2013 | West | |
| 8,566,977 | B2 | 10/2013 | Davis | |
| 8,590,574 | B2 | 11/2013 | Jian et al. | |
| 8,601,623 | B1 | 12/2013 | West | |
| 8,602,032 | B2 | 12/2013 | Goldsmith | |
| 8,661,580 | B2 | 3/2014 | Giap | |
| 8,678,418 | B1 | 3/2014 | Quarles | |
| 8,782,830 | B2 | 7/2014 | Brykalski et al. | |
| 8,789,533 | B2 | 7/2014 | Steffens et al. | |
| D712,555 | S | 9/2014 | Berg | |
| 8,850,634 | B2 | 10/2014 | Ponsi et al. | |
| 8,918,930 | B2 | 12/2014 | Stroh et al. | |
| 8,978,184 | B1 | 3/2015 | Garrett | |
| 9,132,052 | B2 | 9/2015 | Fowler et al. | |
| 9,161,876 | B2 | 10/2015 | Pigazzi et al. | |
| 9,254,231 | B2 | 2/2016 | Vrzalik et al. | |
| 9,271,588 | B1 | 3/2016 | Phillips et al. | |
| 9,308,122 | B2 | 4/2016 | Dunlop | |
| 9,321,392 | B1 | 4/2016 | Lebrun | |
| 9,326,903 | B2 | 5/2016 | Locke | |
| 9,332,850 | B2 | 5/2016 | Krishtul | |
| 9,375,343 | B2 | 6/2016 | Marshall et al. | |
| 9,522,078 | B2 | 12/2016 | Pizzini | |
| 9,538,853 | B2 | 1/2017 | Vrzalik et al. | |
| 9,554,956 | B2 | 1/2017 | Reiners et al. | |
| D781,615 | S | 3/2017 | Parman | |
| 9,675,509 | B2 | 6/2017 | Tilk et al. | |
| 9,693,919 | B2 | 7/2017 | Berman | |
| 9,693,920 | B2 | 7/2017 | Fowler et al. | |
| 9,750,656 | B1 | 9/2017 | Pigazzi et al. | |
| 9,782,287 | B2 | 10/2017 | Pigazzi et al. | |
| 9,782,312 | B2 | 10/2017 | Brubaker et al. | |
| 9,782,313 | B2 | 10/2017 | Hindson | |
| 9,795,529 | B2 | 10/2017 | Lehtio | |
| 9,835,344 | B2 | 12/2017 | Vrzalik et al. | |
| 9,849,053 | B2 | 12/2017 | Rigoni et al. | |
| 9,907,408 | B2 | 3/2018 | Vrzalik et al. | |
| 9,931,262 | B2 | 4/2018 | Pigazzi et al. | |
| 9,949,883 | B1 | 4/2018 | Pigazzi et al. | |
| 9,962,122 | B2 | 5/2018 | Augustine et al. | |
| 9,968,500 | B1 | 5/2018 | Amini et al. | |
| 10,016,066 | B2 | 7/2018 | Howard | |
| 10,034,808 | B2 | 7/2018 | Vrzalik et al. | |
| 10,039,680 | B2 | 8/2018 | Galbraith | |
| 10,045,902 | B1 | 8/2018 | Pigazzi et al. | |
| 10,064,770 | B2 | 9/2018 | Reiners et al. | |
| 10,092,470 | B2 | 10/2018 | Lewis | |
| 10,098,800 | B2 | 10/2018 | Pigazzi et al. | |
| 10,112,513 | B2 | 10/2018 | Patrick et al. | |
| 10,159,533 | B2 | 12/2018 | Moll et al. | |
| 10,172,470 | B1 | 1/2019 | Vrzalik et al. | |
| 10,206,830 | B2 | 2/2019 | Fowler et al. | |
| 10,285,888 | B2 | 5/2019 | Liu | |
| 10,285,890 | B1 | 5/2019 | Pigazzi et al. | |
| 10,314,417 | B2 | 6/2019 | Duck | |
| 10,322,050 | B1 | 6/2019 | Pigazzi et al. | |
| 10,363,185 | B2 | 7/2019 | Purdy et al. | |
| 10,363,188 | B2 | 7/2019 | Young | |
| 10,376,430 | B2 | 8/2019 | Liu | |
| 10,398,614 | B2 | 9/2019 | Rigoni et al. | |
| 10,500,115 | B2 | 12/2019 | Weedling | |
| 10,512,578 | B2 | 12/2019 | Visco | |
| 10,561,522 | B2 | 2/2020 | Giap | |
| 10,568,435 | B2 | 2/2020 | Luckemeyer et al. | |
| 10,576,004 | B1 | 3/2020 | Frances | |

(56) References Cited

U.S. PATENT DOCUMENTS 10,588,800 B2 3/2020 Fletcher et al.
10,709,626 B1 7/2020 Gomez
10,716,724 B2 7/2020 Vrzalik et al.
10,765,576 B2 9/2020 Rigoni et al.
10,765,580 B1 9/2020 Augustine
10,772,778 B2 9/2020 Hahn et al.
10,828,216 B2 11/2020 Phalen et al.
10,912,699 B2 2/2021 Pigazzi et al.
10,993,866 B2 5/2021 Augustine
11,020,301 B2 6/2021 Messerschmidt
11,224,548 B2 1/2022 Depauw
11,224,550 B1 1/2022 Gomez
11,266,525 B2 3/2022 Kaforey et al.
11,298,282 B2 4/2022 Davis et al.
11,324,650 B2 5/2022 Zhou et al.
11,364,166 B2 6/2022 Grindstaff et al.
11,439,551 B2 9/2022 Davis et al.
11,471,317 B1 10/2022 Spears
11,484,431 B2 11/2022 Allen
11,484,456 B2 11/2022 Pigazzi et al.
11,510,836 B2 11/2022 Cole et al.
11,607,358 B2 3/2023 Spahn et al.
11,638,670 B1 5/2023 Volz et al.
11,642,267 B2 5/2023 Kea et al.
11,654,068 B2 5/2023 Giap
11,661,129 B2 5/2023 Chambers et al.
11,701,281 B2 7/2023 Meah
11,737,939 B2 8/2023 Davis et al.
11,833,091 B2 12/2023 Vrzalik et al.
11,890,240 B2 2/2024 Ponsi et al.
2001/0013146 A1 8/2001 Wempe
2001/0040402 A1 11/2001 Odderson
2002/0029417 A1 3/2002 Walker
2002/0108179 A1 8/2002 Kiser
2002/0109381 A1 8/2002 Duncan
2002/0112286 A1 8/2002 Upton et al.
2002/0133877 A1 9/2002 Kuiper et al.
2002/0148045 A1 10/2002 Giori et al.
2002/0148474 A1 10/2002 Larson
2003/0009952 A1 1/2003 Gallant et al.
2003/0014821 A1 1/2003 Boyd
2003/0030319 A1 2/2003 Clapper
2003/0041379 A1 3/2003 Habboub et al.
2003/0061663 A1 4/2003 Lampel
2003/0066134 A1 4/2003 Chapman
2003/0159212 A1 8/2003 Patrick et al.
2003/0205920 A1 11/2003 Sprouse et al.
2004/0083550 A1 5/2004 Graebe, Jr.
2004/0123382 A1 7/2004 Berge
2004/0237203 A1 12/2004 Romano et al.
2005/0005358 A1 1/2005 Dudonis
2005/0028273 A1 2/2005 Weedling et al.
2005/0034242 A1 2/2005 Davis
2005/0055768 A1 3/2005 Assink
2005/0076437 A1 4/2005 Johnson
2005/0091749 A1 5/2005 Humbles
2005/0102750 A1 5/2005 Berge
2005/0151410 A1 7/2005 Sprouse
2005/0210595 A1 9/2005 Di Stasio et al.
2005/0229314 A1 10/2005 Chisari
2005/0235423 A1 10/2005 Hetzel et al.
2006/0000016 A1 1/2006 Weedling et al.
2006/0072347 A1 4/2006 Ferraro
2006/0162086 A1 7/2006 Davis
2006/0213010 A1 9/2006 Davis
2007/0006388 A1 1/2007 Townsend
2007/0072690 A1 3/2007 Berenson et al.
2007/0074760 A1 4/2007 Wu
2007/0118993 A1 5/2007 Bates
2007/0266494 A1 11/2007 Deluca et al.
2007/0283498 A1 12/2007 Shelby
2008/0022461 A1 1/2008 Bartlett et al.
2008/0028516 A1* 2/2008 Morishima .......... A61G 7/1051 5/89.1
2008/0029940 A1 2/2008 Kammer et al.
2008/0078033 A1 4/2008 Wyatt et al.
2008/0209630 A1 9/2008 Kazala et al.
2008/0216231 A1 9/2008 Lambarth et al.
2008/0289102 A1 11/2008 Davis
2009/0000037 A1 1/2009 Graebe, Jr.
2009/0211168 A1 8/2009 Bogar
2009/0265857 A1 10/2009 Habegger
2009/0295203 A1 12/2009 Lewis et al.
2010/0257703 A1 10/2010 Vass
2010/0290931 A1 11/2010 Sanders et al.
2011/0035880 A1 2/2011 Cole et al.
2011/0056017 A1 3/2011 Schreiber et al.
2011/0068939 A1 3/2011 Lachenbruch
2011/0072579 A1 3/2011 Receveur et al.
2011/0219546 A1 9/2011 West
2011/0247725 A1 10/2011 Frayne et al.
2011/0271444 A1* 11/2011 Davis .................. A61G 7/1026 5/81.1 R
2011/0277234 A1 11/2011 Jasani
2011/0296609 A1 12/2011 Giap
2011/0304186 A1 12/2011 Andrews
2012/0009844 A1 1/2012 Waters et al.
2012/0073053 A1 3/2012 Turner et al.
2012/0085430 A1 4/2012 Johansson et al.
2012/0124752 A1 5/2012 Patrick
2012/0131746 A1 5/2012 Griffin et al.
2012/0144594 A1 6/2012 Nash
2012/0186012 A1 7/2012 Ponsi et al.
2012/0186013 A1* 7/2012 Ponsi ..................... A61G 7/001 5/81.1 R
2012/0186587 A1 7/2012 Steffens et al.
2012/0210511 A1* 8/2012 Davis .................. A61G 7/1051 5/81.1 R
2012/0245500 A1 9/2012 Polliack et al.
2012/0255124 A1 10/2012 West
2012/0292958 A1 11/2012 Sprouse, II
2012/0304384 A1 12/2012 Scholz et al.
2012/0311783 A1 12/2012 Chiang et al.
2013/0019882 A1 1/2013 Durham et al.
2013/0042409 A1 2/2013 Gil Gomez et al.
2013/0042414 A1 2/2013 Schreiber et al.
2013/0104907 A1 5/2013 Giap
2013/0145549 A1 6/2013 Piegdon et al.
2013/0152950 A1 6/2013 Giap
2013/0205495 A1 8/2013 Ponsi et al.
2013/0263377 A1 10/2013 Wootten
2013/0269111 A1 10/2013 Berg
2013/0270881 A1 10/2013 Fowler et al.
2013/0318723 A1 12/2013 Li
2013/0320746 A1 12/2013 Amirault et al.
2013/0340772 A1 12/2013 Carlson et al.
2014/0007351 A1 1/2014 Cohen
2014/0082836 A1 3/2014 Patrick et al.
2014/0250601 A1 9/2014 Gomez
2014/0277307 A1 9/2014 Gammons et al.
2014/0283305 A1 9/2014 Zysman
2014/0304918 A1 10/2014 Steffens et al.
2014/0338121 A1 11/2014 Giap
2014/0352072 A1 12/2014 Holladay
2015/0040326 A1 2/2015 Fairburn et al.
2015/0113735 A1 4/2015 Anderson et al.
2015/0122266 A1 5/2015 Saunders et al.
2015/0189996 A1 7/2015 Scarlett et al.
2015/0224217 A1 8/2015 Rogers
2015/0225097 A1 8/2015 Anastasia
2015/0238378 A1 8/2015 Bhat et al.
2015/0289817 A1 10/2015 Augustine et al.
2015/0290027 A1 10/2015 Augustine et al.
2015/0290062 A1 10/2015 Augustine et al.
2015/0335165 A1 11/2015 Creekmuir et al.
2015/0369384 A1 12/2015 Frayne
2016/0095777 A1* 4/2016 Berman ............... A61G 7/1026 5/81.1 T
2016/0228281 A1 8/2016 Marshall et al.
2016/0245439 A1 8/2016 Fry
2016/0279007 A1 9/2016 Flatt
2017/0049646 A1 2/2017 Rigoni et al.
2017/0049647 A1* 2/2017 Rigoni ............... A61G 7/05715
2017/0112655 A1 4/2017 Giap

(56) References Cited

U.S. PATENT DOCUMENTS

| | | | | |
|---|---|---|---|---|
| 2017/0119608 | A1 | 5/2017 | Rigoni et al. | |
| 2017/0216117 | A1* | 8/2017 | Rigoni | A61G 7/05715 |
| 2017/0231410 | A1 | 8/2017 | Chon et al. | |
| 2017/0239118 | A1 | 8/2017 | Cole et al. | |
| 2017/0326011 | A1 | 11/2017 | Alvarez et al. | |
| 2018/0017177 | A1 | 1/2018 | Marson et al. | |
| 2018/0140457 | A1 | 5/2018 | Sarma | |
| 2018/0192960 | A1 | 7/2018 | Augustine et al. | |
| 2018/0200130 | A1* | 7/2018 | Liu | A61G 7/1021 |
| 2018/0221229 | A1 | 8/2018 | Kaiser et al. | |
| 2018/0221242 | A1 | 8/2018 | Lee et al. | |
| 2018/0289174 | A1 | 10/2018 | Ye et al. | |
| 2018/0303690 | A1* | 10/2018 | Hahn | A61G 7/05715 |
| 2018/0311097 | A1* | 11/2018 | Rodzewicz | A61G 7/1023 |
| 2018/0353360 | A1 | 12/2018 | Kea et al. | |
| 2018/0369050 | A1 | 12/2018 | Davis et al. | |
| 2019/0046382 | A1 | 2/2019 | Fiset et al. | |
| 2019/0049027 | A1 | 2/2019 | Bais | |
| 2019/0059603 | A1 | 2/2019 | Griffith et al. | |
| 2019/0083341 | A1 | 3/2019 | Ulreich et al. | |
| 2019/0104996 | A1 | 4/2019 | Augustine et al. | |
| 2019/0151177 | A1 | 5/2019 | Giap | |
| 2019/0159843 | A1 | 5/2019 | Demri et al. | |
| 2019/0358102 | A1 | 11/2019 | Ueda | |
| 2020/0008976 | A1 | 1/2020 | Molloy et al. | |
| 2020/0060912 | A1 | 2/2020 | Hollabaugh et al. | |
| 2020/0100606 | A1 | 4/2020 | Ganji | |
| 2021/0093498 | A1 | 4/2021 | Lafleche et al. | |
| 2021/0275371 | A1 | 9/2021 | Fowler et al. | |
| 2021/0401076 | A1 | 12/2021 | Jenkins et al. | |
| 2022/0000692 | A1 | 1/2022 | Gomez | |
| 2022/0023121 | A1 | 1/2022 | Davis | |
| 2022/0096304 | A1 | 3/2022 | Kaiser et al. | |
| 2022/0323283 | A1 | 10/2022 | Boulos et al. | |
| 2023/0011458 | A1 | 1/2023 | Parikh et al. | |
| 2023/0064553 | A1 | 3/2023 | Fogel et al. | |
| 2024/0156661 | A1 | 5/2024 | Kaforey | |
| 2024/0156662 | A1 | 5/2024 | Kaforey et al. | |

FOREIGN PATENT DOCUMENTS

| | | | | |
|---|---|---|---|---|
| CN | 211326149 | U | 8/2020 | |
| DE | 10 2010 007 457 | | 8/2011 | |
| EP | 3 162 347 | A1 | 5/2017 | |
| FR | 2923367 | A1 | 5/2009 | |
| GB | 2 300 845 | A | 11/1996 | |
| GB | 2 402 075 | A | 12/2004 | |
| GB | 2 415 912 | | 1/2006 | |
| JP | 10-117907 | A | 5/1998 | |
| SE | 527345 | C2 | 2/2006 | |
| WO | WO-88/10082 | A1 | 12/1988 | |
| WO | WO-96/27357 | A1 | 9/1996 | |
| WO | WO-02/065877 | A1 | 8/2002 | |
| WO | WO-2004/050002 | A1 | 6/2004 | |
| WO | WO-2005/007673 | | 1/2005 | |
| WO | WO-2005/086664 | A2 | 9/2005 | |
| WO | WO-2005/107673 | A1 | 11/2005 | |
| WO | WO-2012001423 | A2 * | 1/2012 | A61G 7/1026 |
| WO | WO-2012/170934 | A2 | 12/2012 | |
| WO | WO-2015/081233 | A1 | 6/2015 | |
| WO | WO-2015/081271 | A2 | 6/2015 | |
| WO | WO-2017/185039 | | 10/2017 | |
| WO | WO-2017/197326 | A1 | 11/2017 | |
| WO | WO-2019/060424 | A1 | 3/2019 | |
| WO | WO-2019/152624 | A1 | 8/2019 | |
| WO | WO-2020/041493 | A1 | 2/2020 | |
| WO | WO-2020/136796 | A1 | 7/2020 | |

OTHER PUBLICATIONS

"Boost" Definition in the Cambridge English Dictionary, cited by Examiner in Non-Final Office Action mailed on May 11, 2021, for U.S. Appl. No. 16/547,343.

International Search Report and Written Opinion for International Application No. PCT/US2019/047540, mailed Nov. 14, 2019, 13 pages.

Blaine Miller, Provisional Draft Declaration, U.S. Pat. No. 8,511,314, Reexamination Control No. U.S. Appl. No. 90/013,087, published Dec. 18, 2018, 11 pages.

Craig Kaforey, Declaration, U.S. Pat. No. 8,511,314, Reexamination Control No. U.S. Appl. No. 90/013,087, published Sep. 10, 2014, 13 pages.

Craig Kaforey, Declaration, U.S. Pat. Nos. 8,511,314 and 8,464,720, Reexamination Control Nos. U.S. Appl. No. 90/013,088 and U.S. Appl. No. 90/013,088, published Apr. 18, 2014, 3 pages.

Craig Kaforey, Declaration, U.S. Pat. Nos. 8,511,314 and 8,464,720, Reexamination Control Nos. U.S. Appl. No. 90/013,088 and U.S. Appl. No. 90/013,088, published Sep. 10, 2014, 6 pages.

Dr. Alessio Pigazzi, Declaration, U.S. Pat. Nos. 8,511,314 and 8,464,720, Reexamination Control Nos. U.S. Appl. No. 90/013,088 and U.S. Appl. No. 90/013,088, published Sep. 10, 2014, 30 pages.

Dr. Gustavo Plasencia, Declaration, U.S. Pat. Nos. 8,511,314 and 8,464,720, Reexamination Control Nos. U.S. Appl. No. 90/013,088 and U.S. Appl. No. 90/013,088, published Sep. 10, 2014, 28 pages.

Dr. Maheswari Senthil, Declaration, U.S. Pat. No. 8,511,314, Reexamination Control No. U.S. Appl. No. 90/013,087, published Apr. 18, 2014, 18 pages.

Dr. Thomas Ljungman, Declaration, U.S. Pat. Nos. 8,511,314 and 8,464,720, Reexamination Control Nos. U.S. Appl. No. 90/013,088 and U.S. Appl. No. 90/013,088, published Sep. 10, 2014, 9 pages.

Extended European Search Report for EP Application No. 19151698.8, dated Apr. 17, 2019, 6 pages.

Glenn E. Beltz, Affidavit, U.S. Pat. Nos. 8,511,314 and 8,464,720, Reexamination Control Nos. U.S. Appl. No. 90/013,088 and U.S. Appl. No. 90/013,088, published Sep. 10, 2014, 19 pages.

Gustavo Plasencia, Declaration, U.S. Pat. No. 8,511,314, Reexamination Control No. U.S. Appl. No. 90/013,087, published Apr. 18, 2014, 29 pages.

Immedia OneWayGlide Rehab Assist, Jun. 15, 2004 http://www.rehabassist.com.au/immedia.htm.

International Search Report and Written Opinion for International Application No. PCT/US2018/037372, mailed Sep. 13, 2018, 13 pages.

International Search Report and Written Opinion for International Application No. PCT/US2022/018215, mailed Aug. 9, 2022, 18 pages.

Invitation to Pay Additional Fees for International Application No. PCT/US2022/018215, mailed Jun. 15, 2022, 12 pages.

Jennifer Klauschie et al., "Use of Anti-Skid Material and Patient-Positioning to Prevent Patient Shifting during Robotic-Assisted Gynecologic Procedures," J. Minim Invasive Gynecol., 2010; 17(4):504-507.

Michael Madigan, Affidavit, U.S. Pat. Nos. 8,511,314 and 8,464,720, Reexamination Control Nos. U.S. Appl. No. 90/013,088 and U.S. Appl. No. 90/013,088, published Sep. 10, 2014, 32 pages.

OneWayGlide Instruction for Use, Immedia, Version 6, 2016, p. 7.

Paul Lloyd, Declaration, U.S. Pat. Nos. 8,511,314 and 8,464,720, Reexamination Control Nos. U.S. Appl. No. 90/013,088 and U.S. Appl. No. 90/013,088, published Sep. 10, 2014, 4 pages.

Record of Oral Hearing held Dec. 14, 2015, Appeal No. 2015-007832, Reexamination Control No. U.S. Appl. No. 90/013,088, mailed Jan. 4, 2016.

Romedic OneWaySlide, Handicare, Dec. 6, 2010.

Soule Medical, Patient Positioning Systems Product Catalog, published Jan. 1, 2015, 63 pages.

"How to Set Up Kool Kat", Aug. 11, 2013, SKY High Amusements, Minutes 1:55-2:30, http://www.youtube.com/watch?v=a966cR6v6sc (Year: 2013).

Dec. 4, 2012—(WO) International Search Report and Written Opinion—App PCT/US2012/041729 (003230.00262), 15 pages.

Dec. 10, 2013—International Preliminary Report on Patentability—App PCT/US2012/041729 (003230.00262), 8 pages.

Dec. 31, 2013—(US) Final Office Action—U.S. Appl. No. 13/014,497 (003230.00240).

Jul. 12, 2013—(WO) International Search Report and Written Opinion—App PCT/US2013/036448 (003230.00272), 9 pages.

(56) References Cited

OTHER PUBLICATIONS

Jul. 2, 2013—(US) Non-Final Office Action—U.S. Appl. No. 13/014,497 (003230.00240).
Mar. 20, 2013—(US) Non-Final Office Action—U.S. Appl. No. 13/014,500 (003230.00241).
Mar. 28, 2014—(US) Non-Final Office Action—U.S. Appl. No. 13/156,103 (003230.00242).
May 15, 2014—(WO) International Search Report and Written Opinion—App PCT/US12/22572 (003230.00252), 25 pages.
Nov. 28, 2014—(EP) Search Report—App 14159820.1.
Jun. 25, 2015—(EP) Extended Search Report—App 12739957.4.
May 15, 2015—(WO) International Search Report and Written Opinion—App PCT/US2014/067672 (003230.00304).
Sep. 14, 2015—(US) Non-Final Office Action—U.S. Appl. No. 13/838,952 (003230.00265).
Mar. 14, 2016—(EP) Office Action—App 12739957.4 (003230.00278).
Coleman Quick Pump Fitting Replacement Nozzle Main Adapter and Pinch Valve Tip, Sep. 6, 2014, Amazon.com, https://www.amazon.com/Coleman-Fitting-Replacement-Nozzle-Adapter/dp/B00JHRJ03A/ref=cm_cr_arp_d_product_top?ie=UTF8.
Communication pursuant to Article 94(3) EPC for EP Application No. 12728152.5 date Apr. 22, 2015, 5 pages.
International Search Report and Written Opinion for International Application No. PCT/US2017/028954, mailed Nov. 24, 2017, 16 pages.
Photos of Stryker Glide holding strap, date unknown, two pages.
Prism Medical Company, 5300 Ergoglide Instructions, 2009, 2 pp. Maryland Heights, MO.
Stryker Operations/Maintenance Manual for Stryker Glide Lateral Air Transfer System, Model 3062, date unknown, 33 pages.
Textbook of Palliative Nursing, Nov. 10, 2005, Oxford University Press, XP002740850, 1 page.
Waverley Glen, One-Way Glide—The Grimstead Range of Transfer and Repositioning Aids, Ontario Canada, downloaded Jun. 11, 2012, 3 pages.

* cited by examiner

SYSTEMS AND METHODS FOR LIFTING AND POSITIONING A PATIENT

CROSS-REFERENCE TO RELATED APPLICATIONS

The present application is a divisional of U.S. patent application Ser. No. 16/547,343, filed Aug. 21, 2019, which claims the benefit of and priority to U.S. Provisional Patent Application No. 62/720,768, filed Aug. 21, 2018, both of which are incorporated by reference herein in their entireties.

BACKGROUND

The present disclosure relates generally to an apparatus, system, and method for lifting, moving, turning, and positioning a person on a support surface or between support surfaces. More particularly, the present disclosure relates to an inflatable patient support device for use in turning and positioning a person and having straps for connecting the device to a hoist for lifting and moving the patient, as well as systems and methods including one or more of such apparatuses.

Nurses and other caregivers at hospitals, assisted living facilities, and other locations often care for patients with limited or no mobility, many of whom are critically ill or injured and/or are bedridden. These patients are dependent upon nurses/caregivers to move, and are at risk of forming pressure ulcers (bed sores) due to their inability to move. Pressure ulcers develop due to pressure on a patient's skin for prolonged periods of time, particularly over areas where bone or cartilage protrudes close to the surface of the skin because such pressure reduces blood flow to the area eventually resulting in tissue death. The risk of forming a pressure ulcer is exacerbated by skin surface damage caused by frictional forces and shearing forces resulting from the patient's skin rubbing or pulling against a surface and excessive heat and moisture, which causes the skin to be more fragile and therefore more susceptible to damage.

One area in which pressure ulcers frequently form in an immobile patient lying on his/her back is over the sacral bone (the "sacrum"), because the sacrum and supporting mattress surface exert constant and opposing pressure on the skin, resulting in the aforementioned reduction in blood flow. Furthermore, skin in the sacral region is often more susceptible to damage due to shear and friction resulting from the patient being pushed or pulled over the surface of the mattress to reposition him/her, or from sliding down over the surface of the bed when positioned with his/her upper body in an inclined position for pulmonary reasons.

Existing devices and methods often do not adequately protect against pressure ulcers in bedridden patients, particularly pressure ulcers in the sacral region. One effective way to combat sacral pressure ulcers is frequent turning of the patient, so that the patient is alternately resting on one side or the other thus avoiding prolonged pressure in the sacral region. However, there are several barriers to compliance, resulting in patients not being turned as often as necessary, or positioning properly at a side-lying angle, to prevent pressure ulcers. First, turning patients is difficult and time consuming, typically requiring two or more caregivers. Second, pillows are often stuffed partially under the patient to support the patient's body in resting on his or her left or right side; however, pillows are non-uniform and can pose difficulties in achieving consistent turning angles, as well as occasionally slipping out from underneath the patient. Third, patients who are positioned in an inclined position on the bed often slide downward toward the foot of the bed over time, which can cause them to slip off of any structures that may be supporting them. Additionally, this requires the nurse/caregiver to frequently "boost" the patient back up to the head of the bed, which, like turning, can be difficult and time-consuming, and once again may result in shearing/friction of the patient's skin. Further, many patient positioning devices cannot be left under a patient for long periods of time, because they do not have sufficient breathability and/or compatibility with certain bed functions such as low-air loss (LAL) technology and can be easily stained when soiled.

In addition, caregivers often need to move patients to or from a bed surface for transport, treatment, or examination of the patient. In other cases, for rehabilitation or comfort of the patient, the patient needs to move from a bed to a seated position in a chair, or vice versa. Patients who are unconscious, disabled, or otherwise unable to move under their own power often require the assistance of multiple caregivers to accomplish this transfer. The patient transfer process has traditionally relied upon one or more of several methods, including the use of folded bedsheets ("drawsheets") or rigid transfer boards in concert with the exertion of strong pushing or pulling forces by the caregivers to accomplish the move. The process may be complicated by the size of the patient, the patient's level of disability, and/or the patient's state of consciousness.

In addition to being difficult and time-consuming, lifting, moving, positioning, transferring and/or boosting patients, types of "patient handling" activities, can result in injury to healthcare workers who push, pull, or lift the patient's body weight. For healthcare workers, the most prevalent cause of injuries resulting in days away from work is overexertion or bodily reaction, which includes motions such as lifting, bending, or reaching and is often related to patient handling. These injuries can be sudden and traumatic, but are more often cumulative in nature, resulting in gradually increasing symptoms and disability in the healthcare worker.

In recognition of the risk and frequency of healthcare worker injuries associated with patient handling, safe patient handling procedures and/or protocols are often implemented in the healthcare setting. These protocols stress that methods for moving patients should incorporate a form of assistive device to reduce the effort required to handle the patient, thus minimizing the potential for injury to healthcare workers. Such assistance may be accomplished, for example, with the use of low-friction sheets or air assisted patient transfer devices that utilize forced air to reduce the physical exertion needed from healthcare workers to accomplish the task of moving a patient. The use of a hoist and sling-type product may be used to assist with the lifting, moving, or positioning of a patient.

The present disclosure seeks to overcome certain of these limitations and other drawbacks of existing devices, systems, and methods, and to provide new features not heretofore available.

BRIEF DESCRIPTION OF THE FIGURES

To understand the present disclosure, it will now be described by way of example, with reference to the accompanying drawings in which.

DETAILED DESCRIPTION

Figure 1:
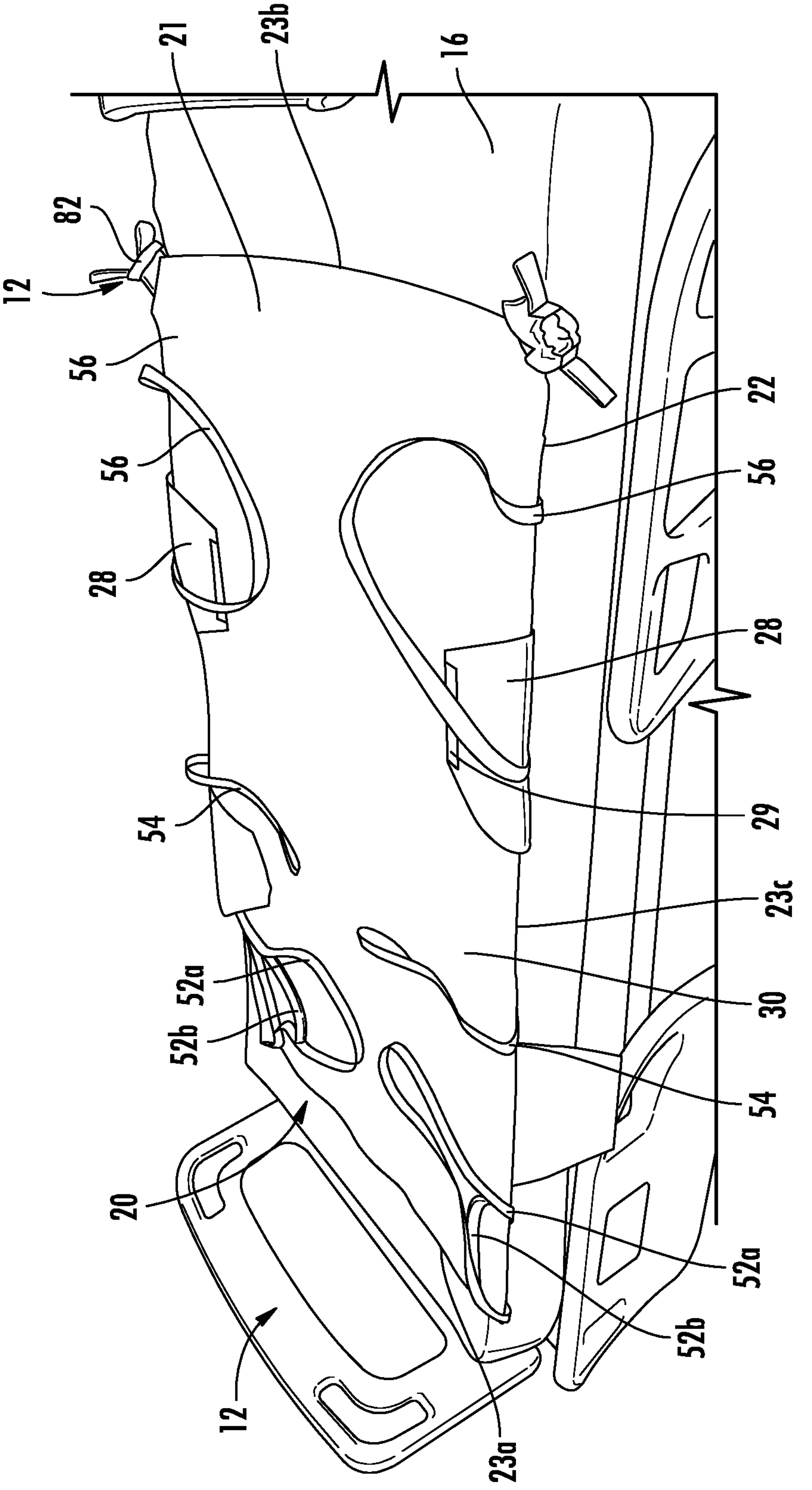
FIG. 1 is a top perspective view of one embodiment of a device for use in lifting, moving, and positioning a patient, according to aspects of the disclosure.

While the systems, devices, and methods described herein are capable of embodiment in many different forms, there are shown in the drawings, and will herein be described in detail, certain embodiments with the understanding that the present disclosure is to be considered as an example of the principles of invention and is not intended to limit the broad aspects of the invention to the embodiments illustrated and described.

In general, aspects of the disclosure relate to a system, including a patient support device with straps for connection to a hoist or similar mechanism and configured to be inflated before, during, and/or after lifting using the hoist. The present disclosure also relates to systems including one or more of such devices and methods utilizing one or more of such systems and/or device. Various embodiments are described below.

Referring now to the figures, there is shown an example embodiment of a system 10 for use in lifting, moving, and positioning a person resting on a surface, such as a patient positioned on a hospital bed. The system 10 includes a patient support device (hereinafter, "device") 20 configured for connection to a hoist 60 (shown in FIGS. 10-16 and 22-23) for lifting the device 20.

Figure 2:
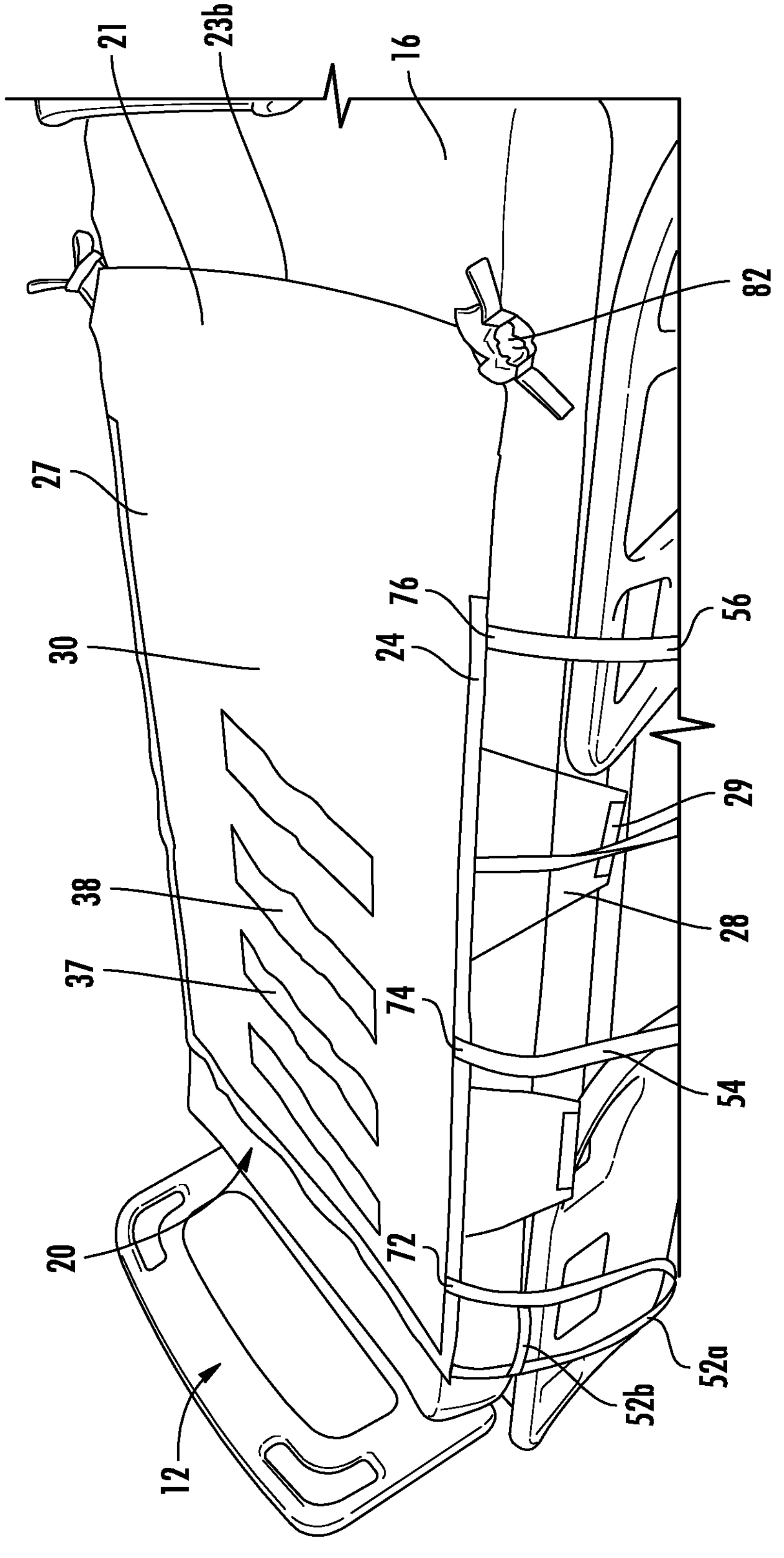
FIG. 2 is a bottom perspective view of a device for use in lifting, moving, and positioning a patient, according to aspects of the disclosure.

Referring to FIGS. 1-2, the device 20 is configured to be placed on a bed 12 or other support apparatus underneath a person lying in a supine position or a position wherein the upper body of the patient is elevated at an incline. A supporting surface 16 can be provided by a mattress or similar structure, and in various embodiments, the mattress can incorporate air pressure support, alternating air pressure support, and/or low-air-loss (LAL) technology. These technologies are known in the art and utilize a pump motor or motors (not shown) to effectuate airflow into, over, and/or through the mattress. For beds having LAL technology, the top of the mattress may be breathable so that the airflow can pull heat and moisture vapor away from the patient. The bed 12 may also include one or more bed sheets (such as a fitted sheet or flat sheet), as well as pillows, blankets, additional sheets, and other components known in the art. Further, the bed 12 may be an adjustable bed, such as a typical hospital-type bed, where the head (or other parts) of the bed 12 can be raised and lowered, such as to incline the patient's upper body. It is understood that the system 10 and the components thereof can be used with other types of beds 12 as well.

In general, the device 20 is flexible and foldable when in the non-inflated state (e.g., FIGS. 1-2), and has a top surface 21 and a bottom surface 22 defined by a plurality of peripheral edges 23, including head edge 23*a*, foot edge 23*b*, and opposing side edges 23*c*. The device 20 is configured to be positioned on the bed 12 so that the bottom surface 22 is above the supporting surface 16 of the bed 12 and faces or confronts the supporting surface 16, and is supported by the supporting surface 16. As used herein, "above," "below," "over," and "under" do not imply direct contact or engagement. For example, the bottom surface 22 being above the supporting surface 16 means that that the bottom surface 22 may be in contact with the supporting surface 16, or may face or confront the supporting surface 16 and/or be supported by the supporting surface 16 with one or more structures located between the bottom surface 22 and the supporting surface 16, such as a bed sheet as described above. Likewise, "facing" or "confronting" does not imply direct contact or engagement, and may include one or more structures located between the surface and the structure it is confronting or facing.

In the embodiment shown, the device 20 has a rectangular shape, having a rectangular main body portion with four peripheral edges 23. The shape of the device 20 may be different in other embodiments, including an irregular hexagonal shape, which may have a rectangular main body portion with three peripheral edges and a narrowed or tapering head portion with three additional peripheral edges. The device 20 generally forms an inflatable body 30 that includes an internal cavity 31 configured to be inflated with air or another gaseous substance. The inflatable body 30 is defined by at least a top sheet 26 forming a top wall of the cavity 31 and a bottom sheet 27 forming a bottom wall of the cavity 31, with the top sheet 26 and the bottom sheet 27 connected together to define the cavity 31 between them. The top and bottom sheets 26, 27 are two separate pieces of sheet material that are connected together around their peripheries, such as by stitching and/or adhesives, or one or more other connection techniques described herein. In other embodiments, the top and bottom sheets 26, 27 may be made from a single piece of material that is folded over and connected by stitching along the free ends or that is formed in a loop, or the top and/or bottom sheets 26, 27 may be formed of multiple pieces. Both the top and bottom sheets 26, 27 may be formed of the same material in one embodiment, although these components may be formed of different materials in another embodiment. It is understood that either or both of the sheets 26, 27 may have a single layer or multiple layers that may be formed of the same or different materials.

Figure 7:
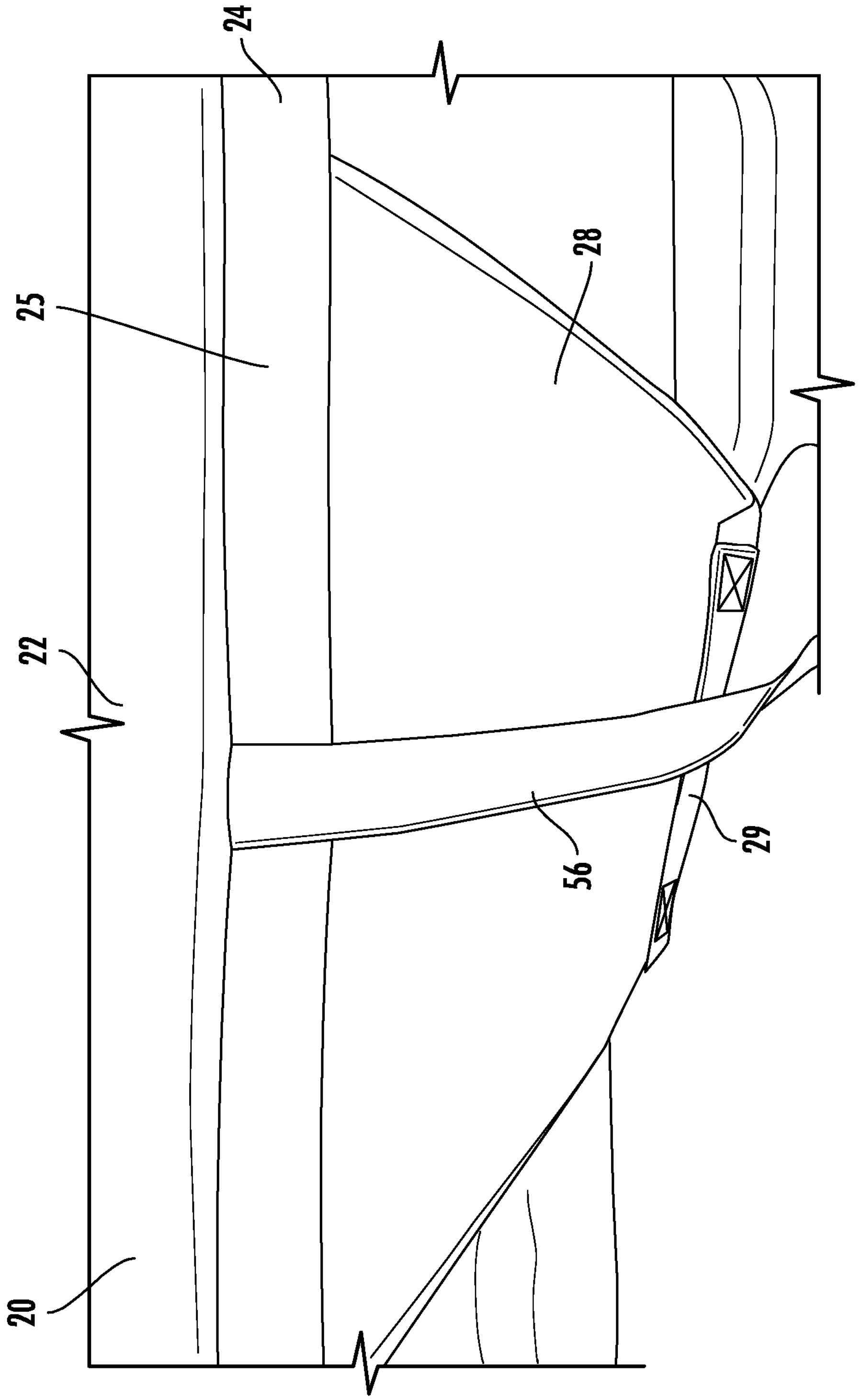
FIG. 7 is a magnified view of a portion of a strap of the device of FIGS. 1-2.

In addition to being configured for inflation for boosting, moving, turning, and positioning a patient, the device 20 is also configured for connection to a hoist 60 for lifting the device 20 and the patient 70 on top of the device 20 (see FIG. 7). In the embodiment shown in the figures, the device 20 has a plurality of connection members, including loops and straps, configured for connection to a hoist 60 for lifting the patient 70 on the device 20, as depicted in FIGS. 8-16. Referring to FIGS. 1-4, the connection members may include one or more upper support loops 52 connected near the upper portion of the device 20 (i.e., towards the head edge 23*a*), one or more central support straps 54 connected to a center or middle portion of the device 20, and one or more lower support loops 56 connected to the device 20 near the lower portion of the device 20 (i.e., towards the foot edge 23*b*). In some embodiments, some of the loops or straps 52, 54, and 56 may be configured to be retractable toward the device 20.

Figure 3:
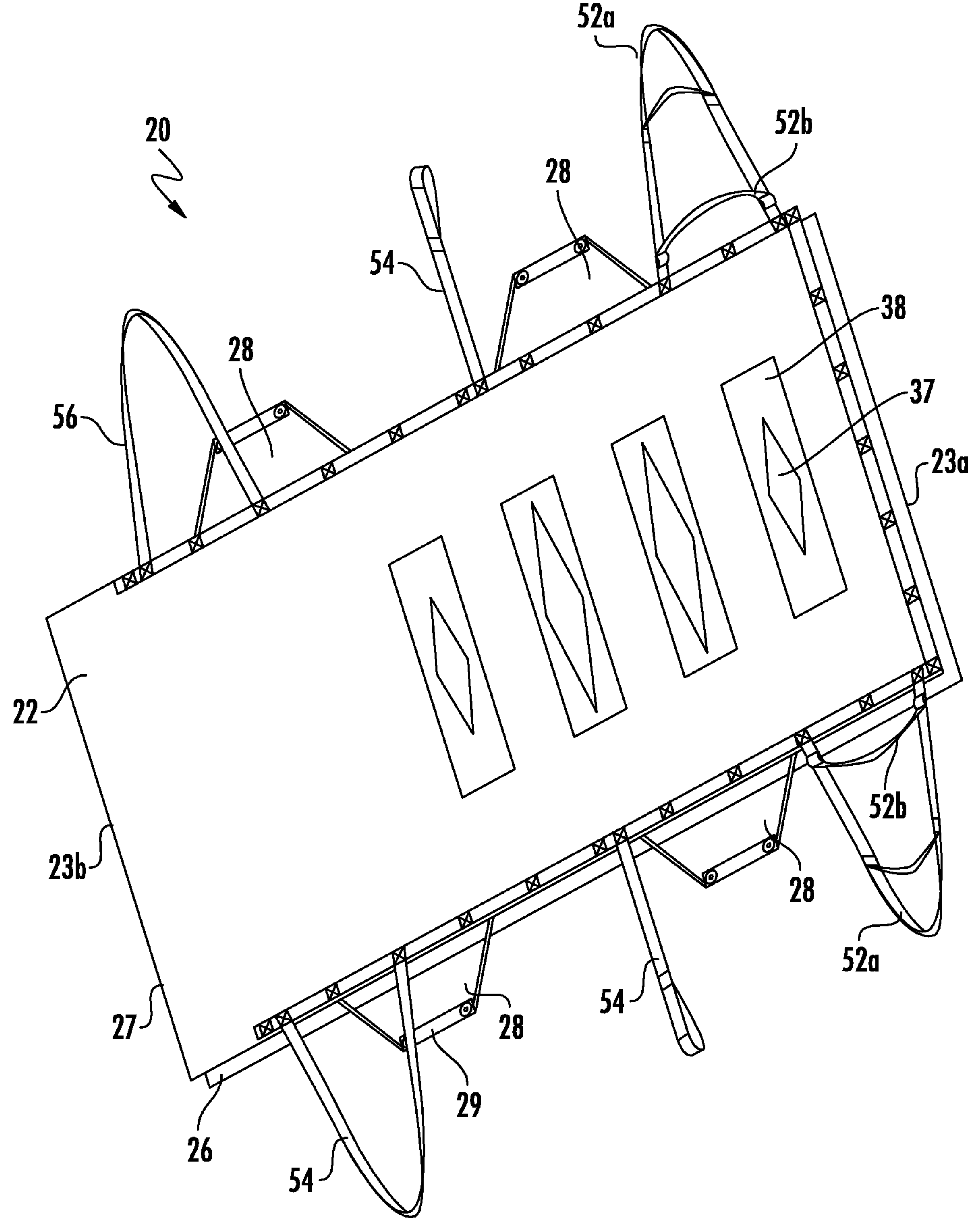
FIG. 3 is an alternative bottom perspective view of the device of FIG. 1.
Figure 4:
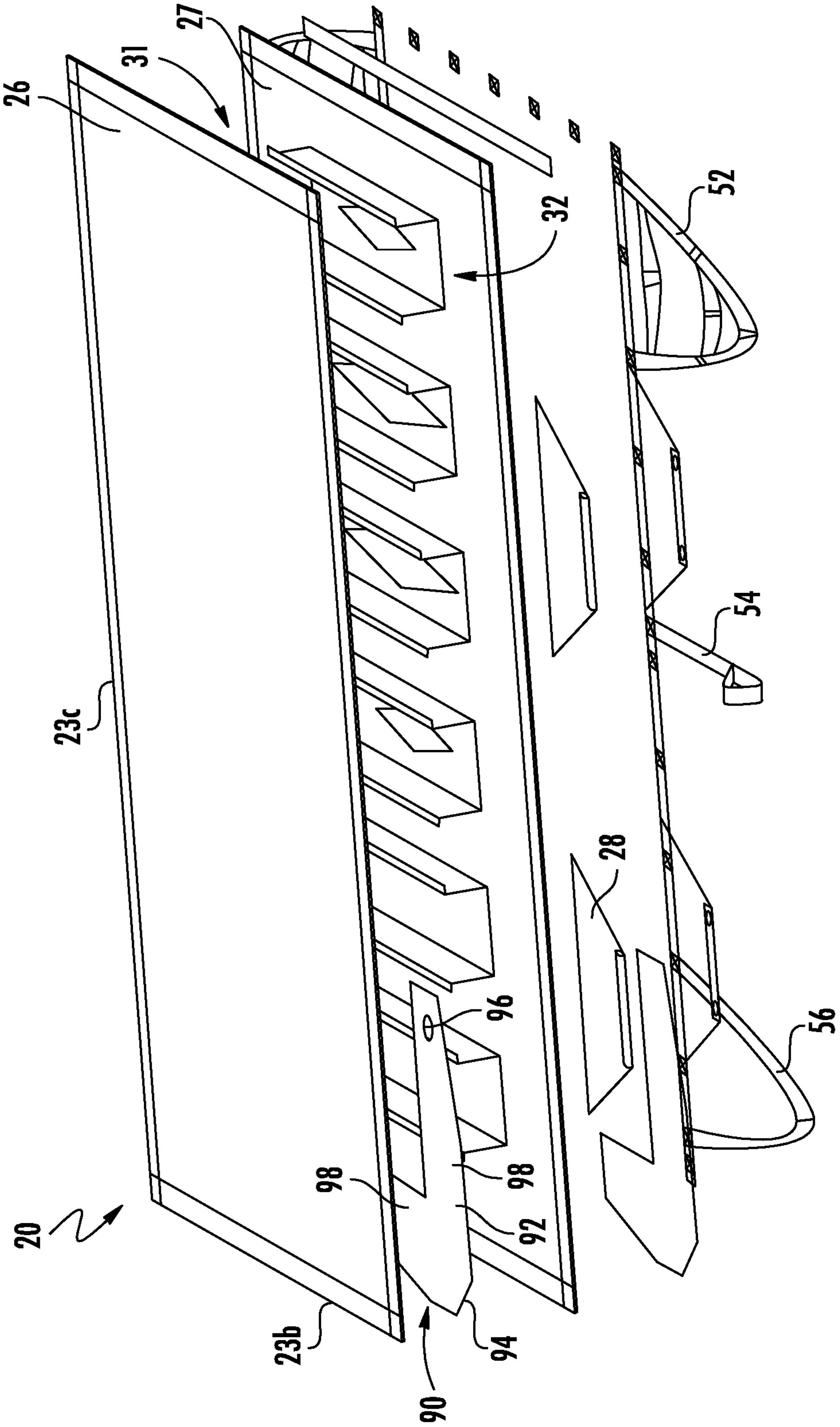
FIG. 4 is an exploded view of the device of FIGS. 1-2.

Referring again to FIGS. 1-4, the device 20 has two sets of upper support loops 52*a*, 52*b* on opposing sides of the device 20 connected to a portion of the device 20 configured to support the patient's upper body and head. The upper support loops 52*a*, 52*b* extend outwardly from the side edges 23*c* of the device 20. The upper support loops 52*a*, 52*b* are made from an inelastic material, and may be made from the same material as the top sheet 26 of the device 20 or as any portion of the device 20, such as the handles 25, 29 described below. In the embodiments shown, the upper support loops 52 include both long upper support loops 52*a* for use in positioning the patient in a repositioning sling arrangement (as shown in FIGS. 10-14), and short upper support loops 52*b* for use in positioning the patient in a universal sling arrangement (as shown in FIGS. 15-18). In the embodiments shown, the short upper support loops 52*b* are located at the same position as the long upper support loops 52*a*. In other embodiments, short upper support loops 52*b* are located at a different position than the long upper support loops 52*a*. Additional lengths of upper support loops, i.e. more than two loops at the same location, may be included as part of the upper support loops 52, for example, as shown in the embodiment of FIGS. 3 and 4.

The upper support loops 52 may be connected to the device 20 at one or more connection points 72 located between the head edge 23*a* and foot edge 23*b* of the device 20 (see FIG. 2), and generally near the head edge 23*a* such that they are near the patient's head when the device 20 is in use. In the embodiment shown, each of the upper support loops 52 comprise two connection points 72 to the inflatable body, such that the upper support loops 52 extends from one connection point 72 to the other, thus forming a loop between the connection points 72. The loop is configured for connection to the hoist 60. In the embodiment shown, the short upper support loops 52*b* are connected to the device 20 at the same one or more connection points 72 as the long upper support loops 52*a*. In other embodiments, the short upper support loops 52*b* may be connected to the device 20 at a different location than the long upper support loops 52*a*. In yet further embodiments, the short upper support loops 52*b* are connected to the long upper support loops 52*a* at a location along the length of long upper support loops 52*a*.

Long upper support loops 52*a* and short upper supports loops 52*b* may be distinguished by using unique indicia. For example, long upper support loops 52*a* may be a different color than short upper supports loops 52*b*. In other embodiments, either the long upper support loops 52*a* or short upper support loops 52*b* may include different markings or a label to distinguish it from the other support loop 52.

The upper support loops 52 (as well as central support straps 54 and lower support loops 56) are connected to the device 20, such as by stitching, for example, a single or multiple box-stitch, welding, or other connection means. The box stitches for connecting the loops 52, 56 and strap 54 are shown more clearly in FIGS. 3 and 4. In the embodiment shown, the upper support loops 52 attach to the device 20 on the bottom surface 22 of the device 20, and in some embodiments, are fastened or otherwise attached to an anchoring strap 24, shown in FIG. 2 extending around a periphery of the bottom surface 22 of the device 20. In some embodiments, anchoring strap 24 also forms handles 25, described below. In some embodiments, anchoring strap 24 may comprise the same material as upper support loops 52.

Referring still to FIGS. 1-4, the device 20 also has two central support straps 54 connected to a center or middle portion of the opposing side edges 23*c* of the device 20 and extending outwardly from the bottom surface 22 of the device 20, although it is understood that there may be a greater or smaller number of central support straps 54. The central support straps 54 may be made of the same material as the upper support loops 52, or may be of a different material.

The central support straps 54 may be connected to the device 20 at one or more connection points 74 located between the head edge 23*a* and foot edge 23*b* of the device (see FIG. 2), and generally in a central portion of the side edges 23*c*. In the embodiment shown in the figures, the central support straps 54 each comprise one connection point 74, such that the central support strap 54 extends from a single point on each of the side edges 23*c*. In the embodiment shown, the central support strap 54 extends from the connection point 74 as a single piece of material, and forms a loop on a distal end of the central support strap 54, which is configured for connection to the hoist 60. In other embodiments, the central support strap 54 may have different configurations, such as extending from a plurality of connection points to from a loop similar to the upper support loops 52. The central support straps 54 are connected to the device 20, such as by stitching, for example, a single or multiple box-stitch, welding, or other connection means. The box stitches for connecting the loops 52, 56 and strap 54 are shown more clearly in FIGS. 3 and 4. In the embodiment shown, the central support straps 54 attach to the device 20 on the bottom surface 22 of the device 20, and in some embodiments, as shown in FIG. 2, are fastened or otherwise attached to the anchoring strap 24. In other embodiments, other attachment mechanisms and configurations of the central support straps 54 are possible.

The device in the embodiment shown also has two lower support loops 56 connected to a connected to a portion of the device 20 configured to support the lower part and feet of the patient 70, and extending outwardly from the bottom surface 22 of the device 20, although it is understood that there may be a greater or smaller number of lower support loops 56. The lower support loops 56 may be made of the same material as the upper support loops 52 and/or the central support straps 54, or may be of a different material.

The lower support loops 56 may be connected to the device 20 at one or more connection points 76 located between the head edge 23*a* and foot edge 23*b* of the device 20 (see FIG. 2), and generally near the foot edge 23*b* such that they are near the feet of the patient 70 when the device 20 is in use. In the embodiment shown, the lower support loops 56 each comprise two connection points 76, such that the lower support loop 56 extends from one connection point 76 to the other, thus forming a loop between the connection points 76. The lower support loops 56 are configured for connection to the hoist 60. The lower support loops 56 are connected to the device 20, such as by stitching, for example, a single or multiple box-stitch, welding, or other connection means. The box stitches for connecting the loops 52, 56 and strap 54 are shown more clearly in FIGS. 3 and 4. In the embodiment shown, the lower support loops 56 attach to the device 20 on the bottom surface 22 of the device 20, and in some embodiments, as shown in FIG. 2, are fastened or otherwise attached to an anchoring strap 24. As described above with respect to upper support loops 52, lower support loops 56 may also include longer and shorter loop portions, for example similar to the set of support loops 52 shown as upper support loops 52*a*, 52*b* in FIGS. 1 and 2, or the three levels of supports loops shown in FIGS. 3 and 4. The different lengths of support loops may be distinguished using unique indicia, such as colors, markings, or labels as described above.

As shown and described above, the upper support loops 52 and lower support loops 56 are each coupled to the device 20 at two locations along or near a peripheral edge 23*c* of the device 20, and may be coupled to the device 20 at more than two locations. In this way, the load of the patient when lifted using the hoist 60 is not concentrated at one location. This provides increased comfort for the patient, avoiding pressure points while being lifted. Similarly, the attachment of loops 52, 56 and straps 54 at or near the peripheral edge 23*c*, provide improved comfort for a patient relative to designs in which the straps pass under the support device 20. In such designs, the narrow straps passing under the support device generate a concentrated area of pressure when the patient is lifted using the hoist. This is avoided in the present design where the loops 52, 56 and straps 54 are attached only at the periphery, or in other embodiments, do not pass continuously under and/or entirely across the underside of the main body. In this way, forces and stresses on the patient's body are distributed more evenly on the device 20, rather than concentrated in the areas where loops or straps pass under and/or are in direct or indirect contact with the patient positioned on the device. However, loops 52, 56 and straps 54 passed under the device 20 and 120 may still be used in conjunction with the device 20 and 120 when it is inflated as described herein.

The sheet material(s) of the top and bottom sheets 26, 27 may have properties that are desirable for a particular application. For example, the sheets 26, 27 may be breathable fabrics or other materials that have sufficient resistance to air passage to retain inflation of the inflatable body 30, while maintaining sufficient breathability to allow passage of heat and moisture vapor away from the patient, thereby enabling the device 20 to be left beneath a patient indefinitely. Such a device 20 may be used in a complementary manner with low air-loss beds, as mentioned above. The material(s) of the top and bottom sheets 26, 27 may also include specific frictional properties, as described herein. Additionally, the material of the top and bottom sheets 26, 27 may have greater permeability to water vapor (i.e., breathability) than its permeability to liquid or air. For example, the top and/or bottom sheets 26, 27 may be formed of a material that is liquid repellant and/or impermeable and may have little to no air permeability, while being permeable to moisture vapor. In one embodiment, the top and bottom sheets 26, 27 may be formed of polyester and/or nylon (polyamide), for example, a coated nylon taffeta material, which can provide these properties. The coating on the sheets 26, 27 has a higher coefficient of friction than the sheet material itself, creating a configuration with a high-friction material (the coating) on one portion of the surface and a low-friction material (the sheet material) on another portion of the surface.

Figure 5:
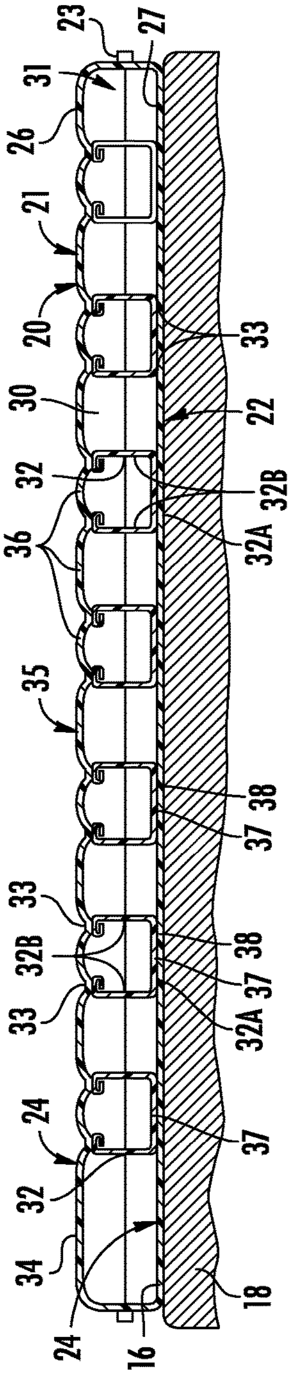
FIG. 5 is a cross-sectional view of the device of FIGS. 1-2.
Figure 6:
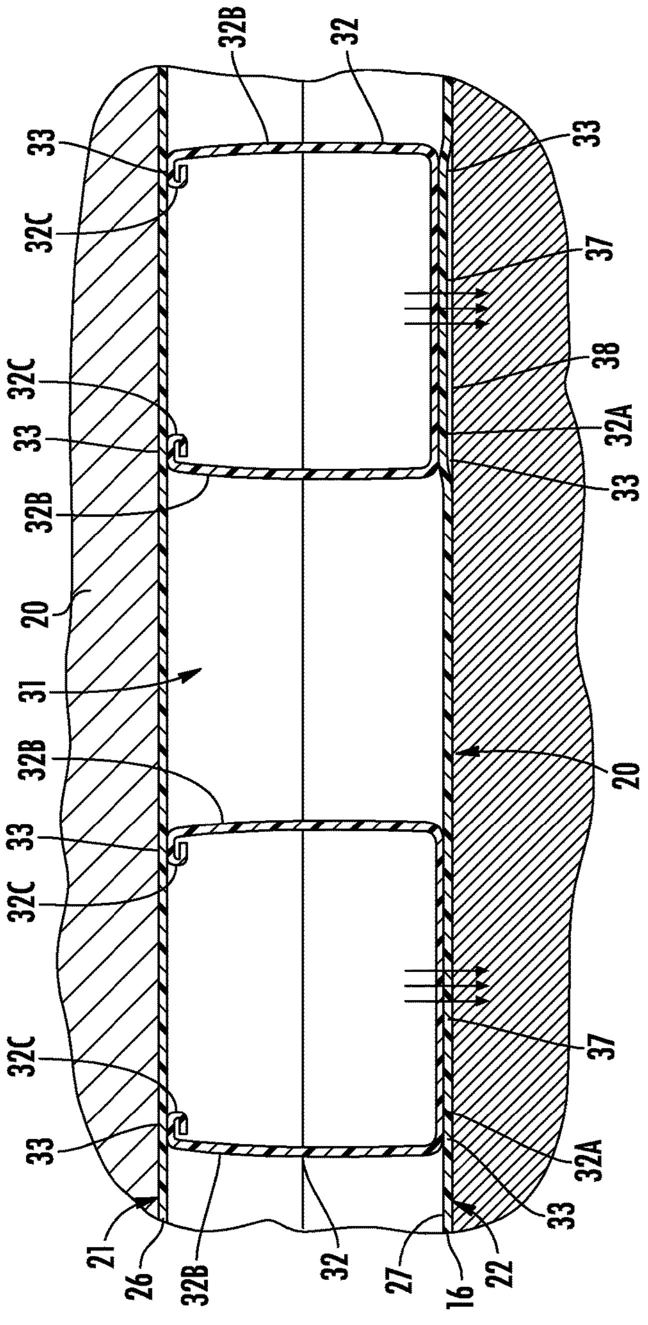
FIG. 6 is a magnified view of a portion of the device as shown in FIG. 3.

The inflatable body 30 of the device 20 includes one or more inflation-limiting members to create a specific inflated shape 20 for the device. Referring to the cross-sectional views of FIGS. 5-6, the inflatable body 30 has a plurality of gussets 32 connected to the top sheet 26 and the bottom sheet 27 and extending across the cavity 31. The gussets 32 in one embodiment are U-shaped in cross-section, having a base 32A connected to one of the top and bottom sheets 26, 27, with two arms 32B extending across the cavity 31 between the top and bottom sheets 26, 27. In the embodiment shown, the device 20 includes U-shaped gussets 32 where the base 32A is connected to the bottom sheet 27, and each of the arms 32B extend to and connect to the top sheet 26. The gussets 32 are elongated, such that the U-shaped cross-section is extended in a direction between the side edges 23*c* and generally parallel to the head edge 23*a* and foot edge 23*b* of the device 20. In this configuration, the base 32A and the two arms 32B of each gusset 32 are formed as generally planar sheet structures that are under tension when the device 20 is inflated, and the arms 32B form walls extending between the top and bottom sheets 26, 27. The gussets 32 may be connected to the sheets 26, 27 by stitching in one embodiment, and other connection techniques described herein may additionally or alternately be used as well. In the embodiment of FIGS. 5-6, the gussets 32 are connected along connection lines 33 that extend in a direction between the side edges 23*c* and generally parallel to the head edge 23*a* and foot edge 23*b* of the device 20. The connection lines 33 may be formed by stitching, adhesive, welding, and/or other connection techniques or combinations of such techniques. In the embodiment shown in FIGS. 5-6, the ends 32C of the arms 32B of the gussets 32 are hemmed and stitched to the top sheet 26 along the connection lines 33, and additional stitching is used to connect the base 32A to the bottom sheet 27 to form connection lines 33 on the bottom sheet 27. The gussets 32 limit inflation of the inflatable body 30, to give the device 20 a mattress-like shape when inflated. The device 20 may include any number of gussets 32 to create a particular inflated configuration or depending on the size of the device 20 and/or the width/ spacing of the gussets 32. In other embodiments, the device 20 may include a different configuration of gussets 32, or the device 20 may include a different type of inflation-limiting structure, such as threads, wires, narrow strips of material, etc., that connect the top and bottom sheets 26, 27 to limit inflation. For example, in one embodiment, the gussets 32 may include only a single arm 32B and no base 32A.

The fully inflated device 20 has a shape that is defined by the configuration of the edges 23 of the device 20 and the size, shape, and configurations of the gussets 32, among other factors. In one embodiment, the inflatable body 30 of the device 20 forms a peripheral cushion around at least some of the edges 23 of the device 20 and a central area at least partially surrounded by the peripheral cushion. For example, the peripheral cushion may extend along all edges 23 of the device 20, so that the central area is surrounded on all sides by the peripheral cushion. In another embodiment, the peripheral cushion may extend only on the left and right side edges 23*c* of the device 20, so that the cushion borders the left and right sides of the central area. The peripheral cushion is raised with respect to at least a portion of the central area, to resist sliding or rolling of the patient 70 off of the device 20 when the device is inflated. The central area also includes swells extending between the stitching lines 33 of the gussets 32. The bottom surface 22 of the device 20 may have a similar structure when inflated, with a peripheral cushion bordering a central area with swells, where at least a portion of the central area is recessed with respect to the cushion. It is understood that the inflated device 20 may have a different shape when under force, e.g., when a patient 70 is positioned on top of and compressing the device 20.

Referring to FIGS. 2-6, the device 20 includes a plurality of passages 37 in the bottom sheet 27 that permit air to pass from the cavity 31 to the exterior of the device 20. The passages 37 extend from the cavity 31 through the bottom sheet 27 to the exterior of the device 20 on the bottom surface 22. Air passing through the passages 37 is forced between the bottom surface 22 of the device 20 and the surface upon which the device 20 sits (e.g., the supporting surface 16), reducing friction between the bottom surface 22 and the supporting surface 16. Passage of air through the passages 37 is illustrated in FIG. 6. This permits easier movement of the device 20 when a patient 70 is positioned on the device 20, as described in greater detail elsewhere herein. The passages 37 in the embodiment of FIGS. 2-6 are located within the central area on the bottom surface 22, between the stitching lines 33 of the gussets 32. Additionally, in one embodiment, some or all of the passages 37 are located immediately below the bases 32A of one or more of the gussets 32. In the embodiment of FIGS. 2-6, all but one of the gussets 32 have passages 37 beneath their bases 32A, and all of the passages 37 are located beneath one of the gussets 32. In other embodiments, all of the gussets 32 may have passages 37 beneath their bases 32A, or at least a majority of the gussets 32 may have passages beneath their bases 32A. In a further embodiment, at least some (or all) of the passages 37 may be located between the gussets 32. In the embodiment shown in FIGS. 2-6, the gussets 32 (or at least the bases 32A thereof) are made from an air-permeable material, such that air passes through the bases 32A of the gussets 32 and downward through the passage(s) 37. The gusset bases 32A in this configuration can function to limit the air flow through the passages 37 to maintain a desired level of inflation of the device 20, as well as to diffuse the air flowing out of the passages 37 to improve the friction-reducing properties created by the air escaping through the passages 37. As used herein, an "air-permeable material" is a material that permits air to pass through, without the necessity for manually forming holes, passages, perforations, slits, openings, etc., in the material, such as by mechanical and/or laser cutting methods.

As described herein, some embodiments include at least one piece of an air-permeable material covering some or all of the passages 37, as shown in FIGS. 2-6, where the air-permeable gussets 32 cover some or all of the passages 37. The permeability of such air-permeable materials can limit or govern the rate of airflow through each passage 37. In one embodiment, the permeability of the air-permeable material covering the passage(s) 37 is configured so that airflow through the passages 37 is sufficiently restricted to keep the device 20 inflated, while also being sufficiently large to permit an effective amount of air to pass through the passage(s) 37 to provide friction reduction between the device 20 and the supporting surface 16. When an air-permeable fabric is used in this structure, the "tightness" of the warp or weave of the material and the resultant sizes of the interstices between the fabric threads influence the permeability of the fabric. Thus, in one embodiment, an air-permeable fabric material may be used that has a suitable average interstice size to provide the desired level of permeability and airflow. A rip-stop nylon fabric material is one example of an air-permeable material that can be used for the gussets 32 and/or other pieces covering the passages 37.

In one embodiment, the device 20 further includes covers 38 that cover at least some of the passages 37, where the covers 38 are air-permeable and permit air to flow through them to form the air cushion beneath the device 20. As shown in FIG. 2, the covers 38 may be connected to the bottom surface 22 of the device 20 by stitching the cover 38 to the bottom sheet 27 around the perimeter of each cover 38 in one embodiment. Other connection techniques may be used in other embodiments, including any technique(s) described herein. The covers 38 in the embodiment shown are rectangular in shape, but may have a different shape in other embodiments. Additionally, as shown in FIGS. 2-6, each cover 38 covers all of the passages 37 in a lateral row, and each cover 38 is positioned beneath a single gusset 32 and is aligned with said gusset 32, but not all passages 37 are covered by a cover 38. In other embodiments, the size, arrangement, and number of the covers 38 may be different. For example, in one embodiment, a cover 38 may cover multiple passages 37 that are spaced from each other in the head-toe direction on the device 20, and in another embodiment, the device 20 may have a single cover 38 or a pair of covers 38 covering some or all of the passages 37. Some or all of the covers 38 may be formed of a directional stitching material, which is configured to interact with contacting surfaces of a positioning wedge(s) and/or the bed 12 to limit sliding of the device 20 in one or more directions. The covers 38 may therefore extend sufficiently close to both of the side edges 23*c* of the device 20. The covers 38 may further limit ingress of dust, dirt, debris, etc., into the passages 37, and the covers 38 can also function to limit the air flow through the passages 37 and diffuse the air flowing out of the passages 37, as similarly discussed above with respect to the gussets 32. The use of two different materials covering the passages 37 in this embodiment may enhance this functionality.

The overall permeability of the materials covering each passage 37 (including the gusset base 32*a* material and/or the cover 38) permits an overall airflow rate of about 36-46 CFM (cubic feet per minute) through the passage 37 in one embodiment, or an overall airflow rate of 39-43 CFM in another embodiment, e.g., an airflow rate of about 41 CFM.

In one embodiment, this overall airflow rate may result from a combination of a gusset 32 and a cover 38 as described herein. In such an embodiment, the gusset 32 may have a lower permeability than the cover 38, as described herein, such as a permeability of 39-47 CFM, a permeability of 41-45 CFM, or a permeability of about 43 CFM, in various examples. The higher-permeability cover 38 may have a permeability of 300-500 CFM, or 350-440 CFM, or about 390 CFM, in various examples. It is understood that these airflow rates are calculated free of extrinsic restrictions, e.g., the bottom surface 22 of the device 20 being placed against a supporting surface 16 in use may affect the actual airflow rates through the passages 37 in use, which is not reflected in the reported figures.

Referring to FIG. 7, in one embodiment, the device 20 also includes one or more handles 25, 29 to facilitate pulling and other manipulation of the device 20. Such handles 25, 29 may be configured for multiple different types of movement, including "boosting" the patient 70 on the bed 12 (i.e., moving the patient 70 toward the head of the support surface), positioning the patient 70 on the bed 12, assisting in moving the patient 70 when the device is used with the hoist 60, etc. As shown in FIG. 7, the device 20 has handles 25 formed by anchoring strap 24 connected (e.g., stitched) in periodic fashion to the bottom surface 22 at or around both side edges 23*c* of the device 20, as well as the top edge 23*a* of the device. The non-connected portions can be separated or pulled away from the device 20 to allow a user's hands to slip underneath, thereby forming the handles 25. The handles 25 formed by the anchoring strap 24 on the side edges 23*c* of the device 20 are useful for pulling the device 20 laterally, to move the patient 70 laterally on the bed 12. The handles 25 formed by the anchoring strap 24 on the side edges 23*c* of the device 20 are also useful in maneuvering the patient 70 when the device 20 is used with the hoist 60. As shown in FIG. 7, the device 20 also includes flaps 28 that are connected (e.g., stitched) near the side edges 23*c* of the device 20 and extend outwardly from the device 20, including handles 29. The flaps 28 extend generally outward from the side edges 23*c* of the device 20. In the embodiment shown, the device 20 has two flaps 28 on each side, each having a handle 29. In some embodiments, the handles 29 are made of the same material as the anchoring strap 24 forming handles 25, to provide a point for gripping. The handles 25, 29 may be useful for moving the device 20 and the patient 70 in many different ways, including pulling the device 20 laterally, turning the patient 70, and/or pulling the device 20 toward the head of the bed 12 to "boost" the patient 70 and device 20 if they begin to slide toward the foot of the bed 12, which may tend to happen especially when the patient 70 is inclined. In particular, the handles 29 on the flaps extending from the sides edges 23*c* of the device 20 are constructed to facilitate rolling of the patient 70, and the wide base of the flaps spreads the force exerted on the device 20 over a larger area, which puts less pressure on the patient 70 during rolling. In other embodiments, the device 20 may include a different number or configuration of the handles 25, 29 as described above. Further, the handles 25, 29 may be connected to the device 20 in a different way, such as by heat welding, sonic welding, adhesive, etc. Other types of handles may be utilized in further embodiments.

Figure 8:
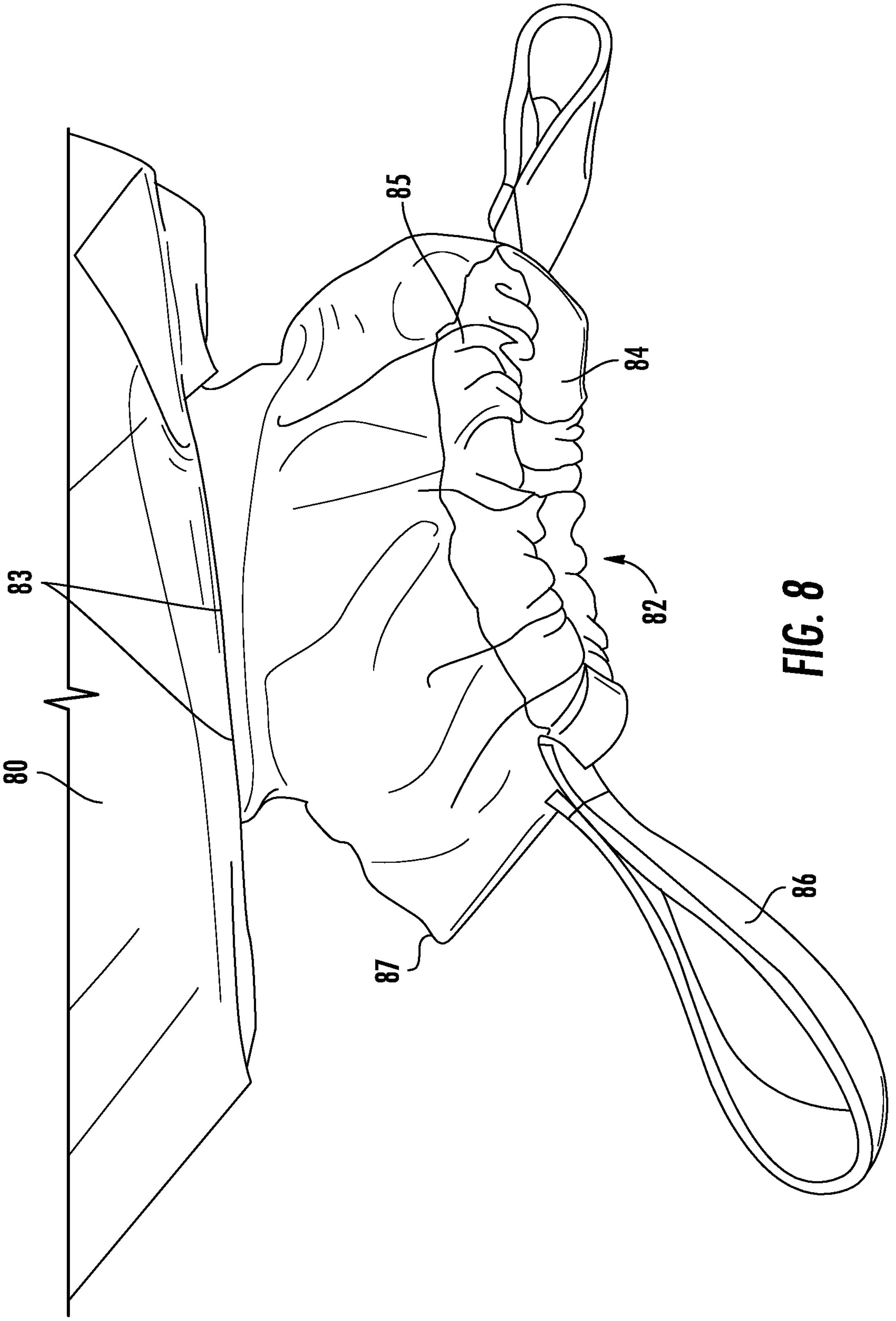
FIG. 8 is a magnified top view of a port sock connected to the device of FIGS. 1-2.
Figure 9:
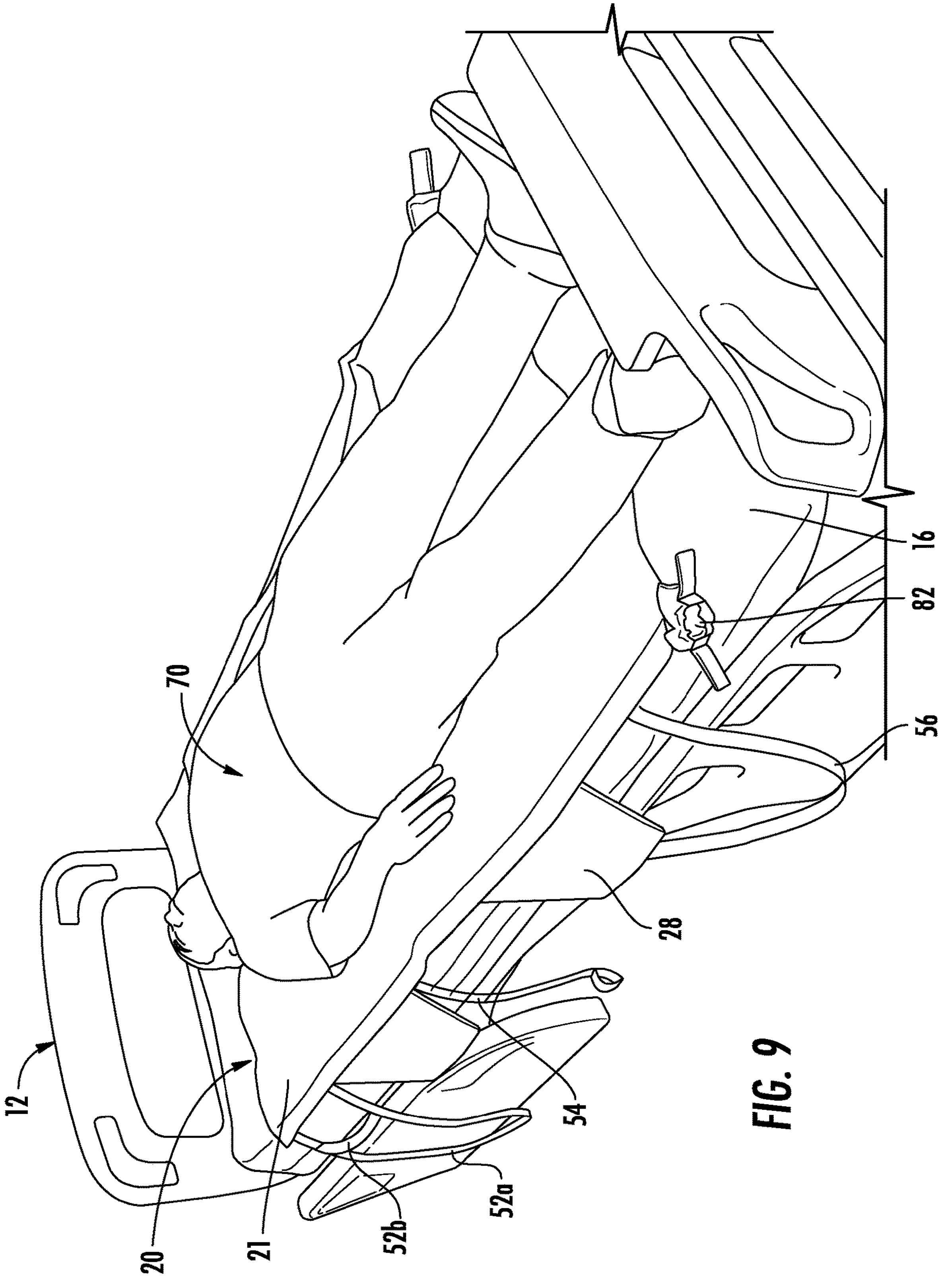
FIG. 9 is a perspective view of the device of FIGS. 1-2 with a patient positioned thereon.

Referring to FIG. 8, the device may include one or more inflation ports 80 for fluid connection to an air source 81 for inflating the device (as shown in FIGS. 10-18). It is understood that a device 20 with multiple ports 80 may include ports 80 on one or more different edges 23 of the device 20, and that the port(s) 80 may be along any edge 23 of the device 20 or anywhere on the device 20. In the embodiment shown in the figures, the device 20 includes two inflation ports 80, each one located at a corner between the foot edge 23*b* and one of the side edges 23*c* of the device 20. Generally, only one of the inflation ports 80 is used at a time, and the dual ports 80 provide for use in diverse arrangements, although both ports 80 could be used simultaneously. In one embodiment, each of the ports 80 is connected to and in fluid communication with a port sock 82 configured to receive the air source 81.

As seen in FIG. 8, the port sock 82 has a first opening 83 and a port opening 84. The first opening 83 is configured to attach or connect to an opening in inflation port 80 for fluid flow into the cavity 31. The port sock 82 is connected to the device 20 in such a way that the port opening 84 may not be flush with side edge 23*c* and foot edge 23*b* of device 20. In other words, when port sock 82 is attached to device 20, port sock 82 may extend out from the device 20. Extending port sock 82 out from the device 20 prevents port sock 82 or port 80 from bunching up and ensures that device 20 remains flat. Port opening 84 of port sock 82 may have a retaining mechanism 85, which is provided in the form of an elastic ring. Side handles 86 (e.g., straps or tabs) are disposed at or along an edge of port opening 84 of port sock 82. Side handles 86 are configured to allow for pulling retaining mechanism 85 to stretch open port opening 84 so that a nozzle of the air source 81 can be inserted into port opening 84. Side handles 86 allow for easier insertion of a nozzle into port opening 84 without stretching port opening 84 to a completely unstretched state. Side handles 86 are also configured to allow for pulling retaining mechanism 85 to open port opening 84 such that the nozzle can be easily removed. Port sock 82 also includes side pouches 87 configured to engage with a nozzle of the air source 81 or an attachment to the nozzle. The side pouches 87 are a portion of the port sock 82 having an increased diameter relative to the first opening 83 and/or port opening 84. In the embodiment shown, the side pouches 87 are two oppositely disposed peak-shaped portions, formed by an increase in diameter from the port opening 84 to a maximum pouch diameter, and then decreasing back down to the diameter of the first opening 83.

Figure 24:
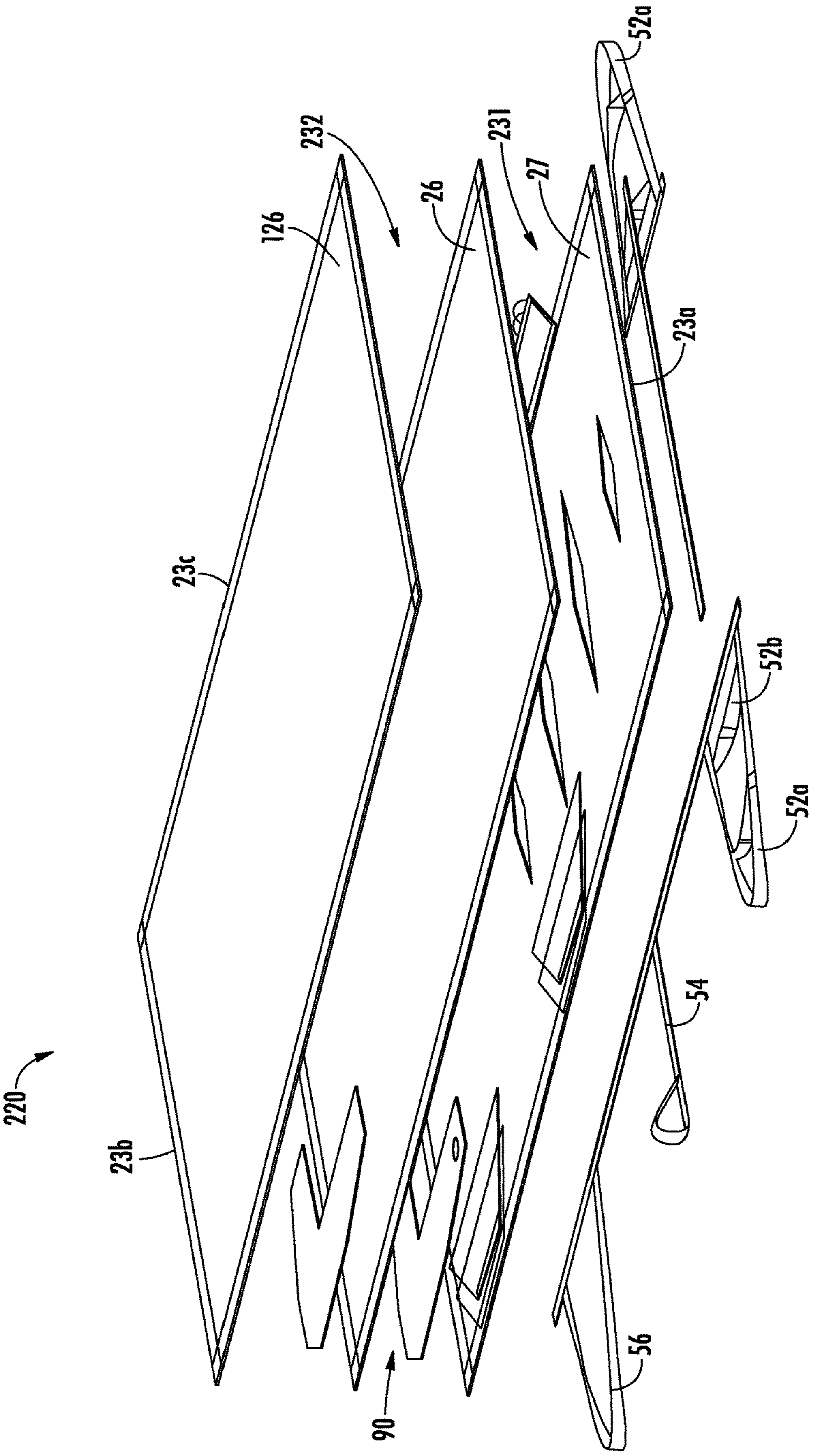
FIG. 24 is a perspective exploded view of a third embodiment of a device for use in lifting, moving, and positioning a patient, according to aspects of the disclosure.

The device 20 may also have a valve 90 in communication with the port 80, as shown in the exploded views of FIGS. 4 and 24. The valve 90 in this embodiment is formed by a pocket 92 that is positioned within the cavity 31 and has an entrance opening 94 in communication with the opening of the port 80 and at least one exit opening 96 in communication with the cavity 31. The pocket 92 may be formed by one or more sheets of flexible material that are folded and/or connected together to define the pocket 92 in the desired shape. Additionally, the pocket 92 may be connected to the inner surfaces of the cavity 31 by stitching or another technique described herein. In the embodiments shown, the pocket 92 is stitched to the inside of the device 20 only around the port 80, and the rest of the pocket 92 is free within the cavity 31. The exit opening(s) 96 may be spaced from the entrance opening 94 so that air must flow through the pocket 92 to reach the cavity 31. In this configuration, airflow through the port 80 passes through the valve 90 by flowing from the port 80 through the entrance opening 94, then through the pocket 92 and out through the exit opening 96 into the cavity 31. The pocket 92 in the embodiments shown has two branches 98 extending away from each other, e.g., to form an L-shape, and the exit openings 96 are located near the ends of the branches 98 to space them from the entrance opening and from each other. The valve 90 may perform multiple functions. For example, the pocket 92 may compress when there is no inward airflow through the entrance opening 94, thus resisting or preventing reverse airflow through the valve 90 and the port 80 when the port 80 is not being used for inflation (i.e., when another port 80 is being used). As another example, the valve 90 reduces noise and dispersion of the air during inflation. As a further example, the pocket 92 may also protect the air source 81 from contact with dirt, dust, debris, and other matter that may be present within the cavity 31. As yet another example, the positioning of the exit openings 96 in the embodiment illustrated makes it difficult or impossible for the patient's leg to rest on top of both of the exit openings 96 of a single valve 90, which could impede air flow through the valve 90. In other embodiments, the valve 90 may be differently configured, such as by having a different shape, a greater or smaller number of exit openings 96, etc. It is understood that the valve 90 and other inflation components of the system 10 are described for use with air, but may be used with any suitable gas. Accordingly, terms such as "air" and "airflow" as used herein may refer to any suitable gas.

Figure 10:
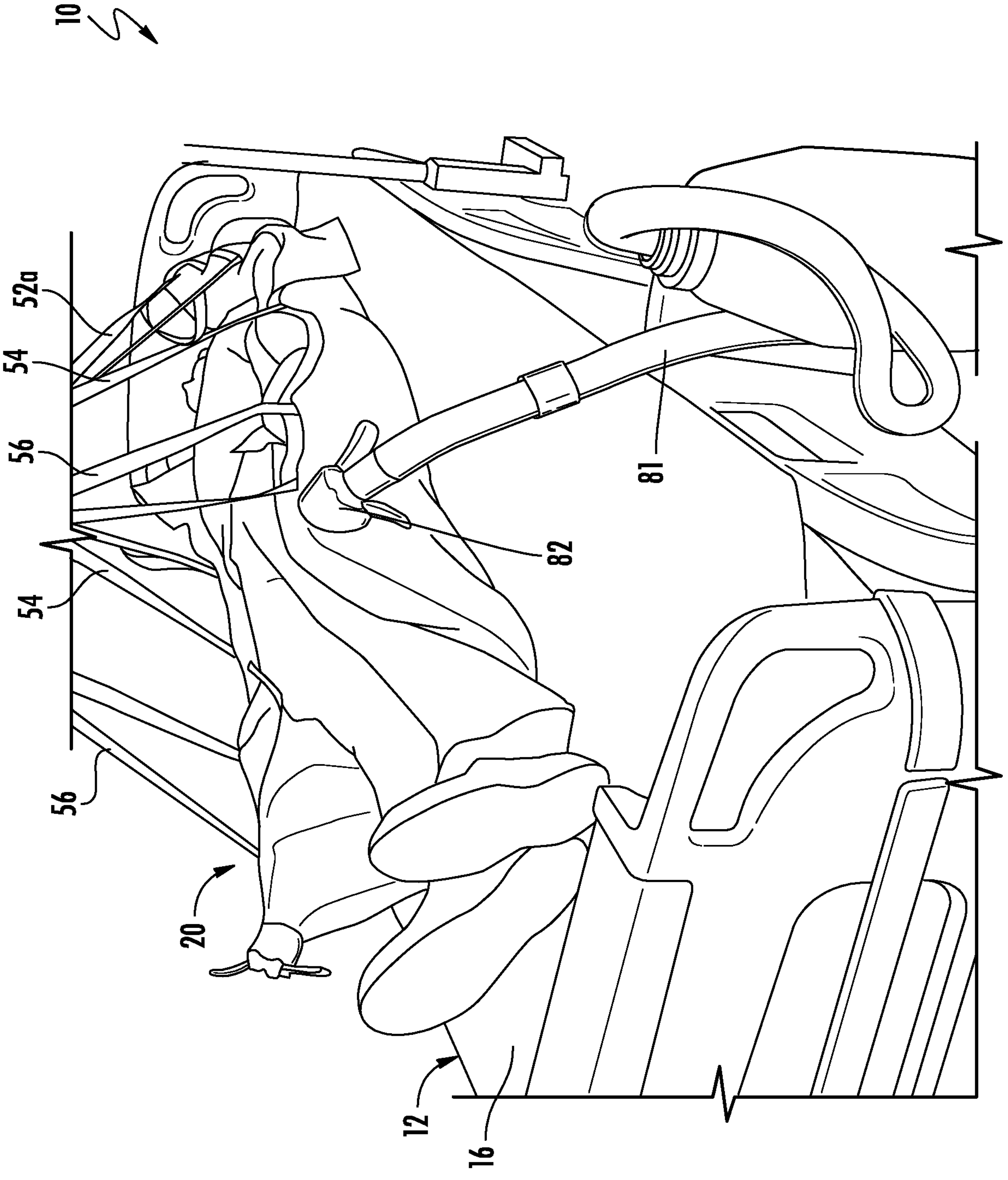
FIG. 10 is a perspective view of one embodiment of a system for lifting, moving, and positioning a patient with an air source connected to a port on the device of FIGS. 1-2.

In some embodiments, the air source 81 includes a hose and connected to a pump (shown in FIG. 10). The pump may further comprise an attachment mechanism to releasably attach the pump to a structure, such as the railing of the bed 12, to prevent movement and potential dislodgement of the air source 81 from the port sock 82 during inflation/deflation of the device 20. In some embodiments, the air source 81 and the pump may be configured to move along with the device 20 when the device 20 is attached to the hoist 60 for transferring the patient 70. In some embodiments, the pump is configured to have at least a second setting, such that there is a reduction in air flow into the device 20 when the device 20 is being used for moving the patient using the hoist. In this way, the pump uses less power minimizing the temperature increase of the pump and the device 20 while inflated and moving the patient.

In some embodiments, the system 10 may also comprise a plurality of positioning wedges to be inserted underneath the device 20 to assist in patient positioning. Furthermore, in some embodiments, the system 10 may comprise one or more selective gliding assemblies positioned between components of the system 10 to permit sliding of the components relative to each other in certain directions and to resist sliding of the components relative to each other in at least one direction. The selective gliding assemblies may be formed by one or more directionally-oriented engagement members, such as a directional stitching material or a directional glide material. Finally, the materials and surfaces of the device 20 may comprise high friction and low friction portions, provided by the material itself or by a coating, or by use of additional high or low friction materials. Examples of a system comprising selective gliding assemblies, wedges, high and low friction surfaces, and methods of use thereof as part of the system 10 are described in detail in U.S. Pat. No. 9,849,053, granted Dec. 26, 2017, which is incorporated by reference herein in its entirety.

All or some of the components of the system 10 can be provided in a kit, which may be in a pre-packaged arrangement, as described in U.S. Pat. No. 8,850,634, granted Oct. 7, 2014, which is incorporated by reference herein in its entirety. For example, the device 20 may be provided in a pre-folded arrangement. The pre-folded device 20 can then be unfolded together on the bed 12, to facilitate the use of the system 10. Additionally, the device may be packaged by wrapping with a packaging material to form a package and may be placed in the pre-folded assembly before packaging. In some embodiments, a body pad or one or more wedges and/or the pump may also be included in the package. Other packaging arrangements may be used in other embodiments.

Figure 11:
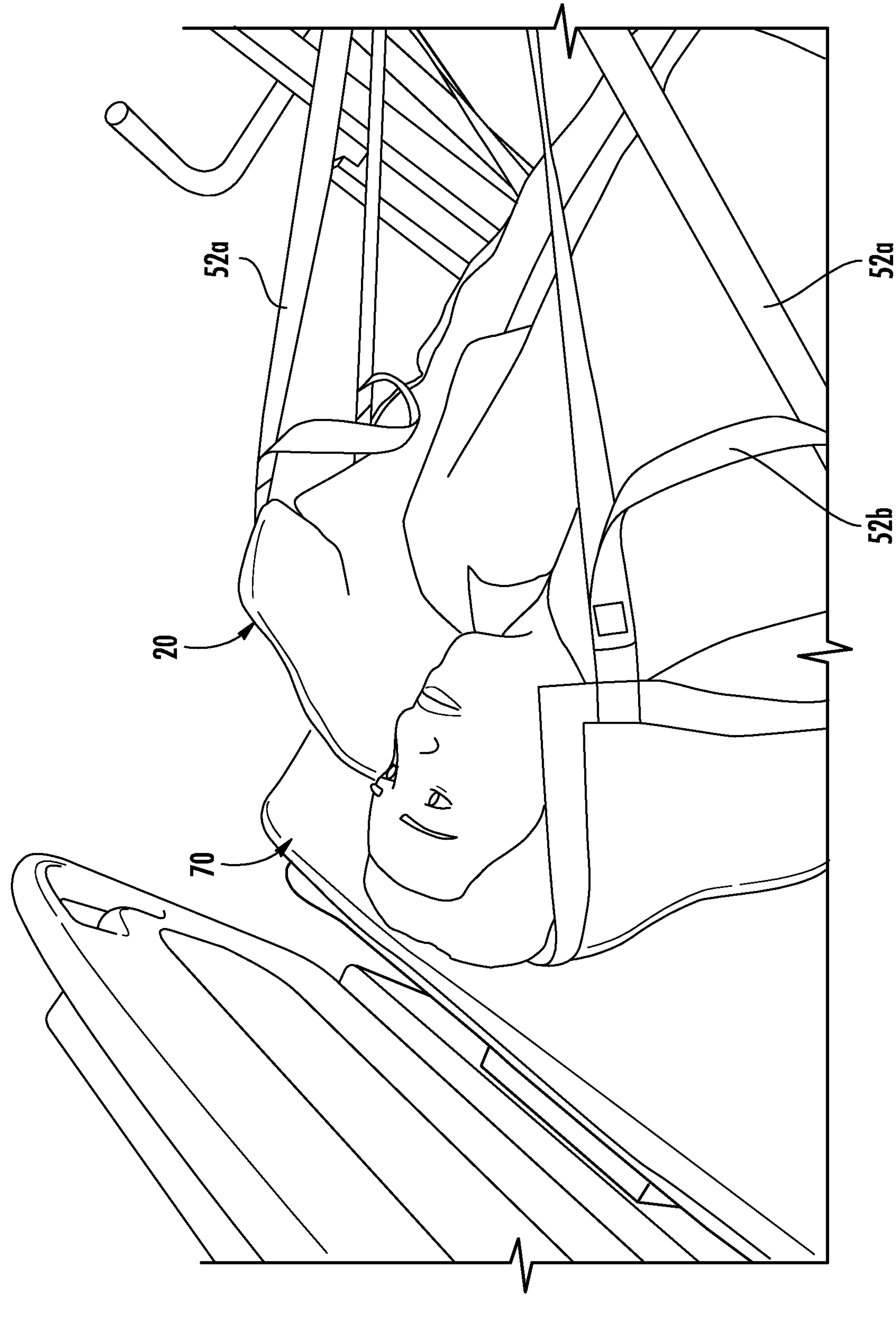
FIG. 11 is a magnified view of a portion of the device of FIG. 1-2 in an inflated configuration supporting the head of the patient.

In some uses, the device 20 may be used for boosting, turning, and positioning a patient on the support surface 16. In some such uses, the device is inflated by connecting the air source 81 to one of the port socks 82. In accordance with this disclosure, the device 20 is also inflated for lifting and transferring the patient using the hoist 60. The inflation of the device 20 prior to and during the lifting of the patient 70 using the hoist provides several benefits over conventional sling devices. In particular, the inflated device increases the comfort and security of the patient in the sling. As described above, device 20 is configured to form a peripheral cushion when inflated. During lifting, this peripheral cushion secures the patient and provides a softness around their body, limiting pressure points on the body. See, for example, FIG. 11 showing the patient's head supported by the peripheral cushion of the inflated device 20. Furthermore, the inflated center portion provides additional cushioning and comfort to the patient. Finally, the use of air to inflate the device 20 counteracts some of the pulling forces that may be experienced on portions of the device during lifting. Whereas an uninflated device may experience "creeping" of portions of the sling device, such as the lower portion of the device pulling up towards the upper legs due to the tension in lower lifting straps, the inflation of the device 20 helps to maintain the device 20 in its extended position and limit such creeping effect.

In FIGS. 10-14, the device 20 is shown being used to lift the patient 70 using a hoist 60. In this arrangement, the patient is being lifted in a "repositioning" sling configuration. The device 20 is placed beneath the patient 70 sometime prior to lifting the patient 70. For lifting the patient 70, the device 20 is connected to a hoist 60. In the embodiment of FIGS. 10-14, the device 20 is attached to the hoist 60 via the long upper support loops 52*a*, the central support straps 54, and the lower support loops 56. Such an attachment acts to cradle the patient 70 in a substantially horizontal (supine) position.

Figure 12:
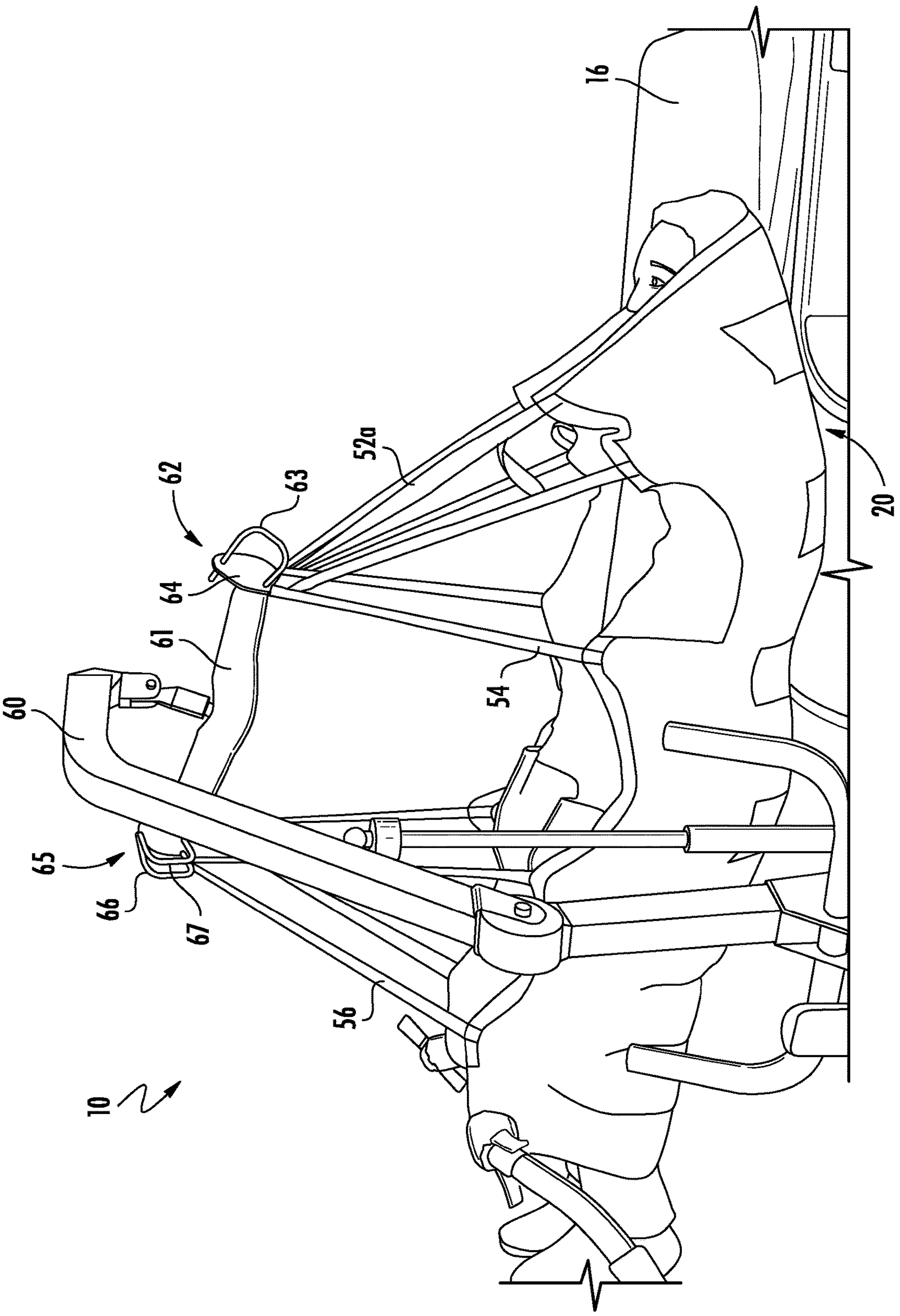
FIG. 12 is a perspective view of one embodiment of a system for lifting, moving, and positioning a patient including a hoist to lift the device of FIGS. 1-2 in a first arrangement.
Figure 13:
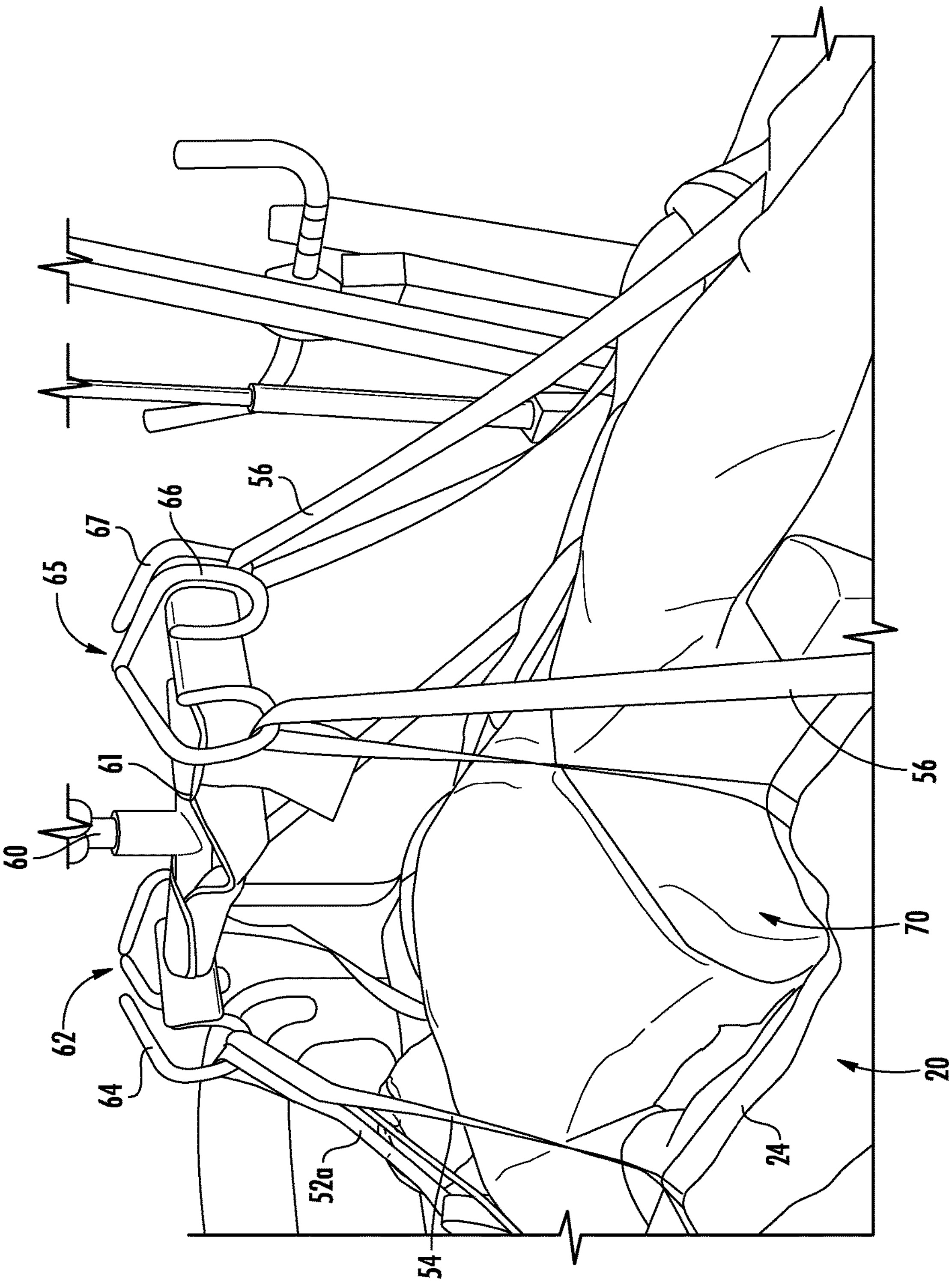
FIG. 13 is a magnified view of an attachment mechanism of the hoist of FIG. 10.

Referring now to FIGS. 12 and 13, the hoist 60 may have a support structure 61 (e.g., spreader bars) for connection to the straps 52, 54, 56. The support structure 61 may comprise a first side 62 and a second side 65, located on opposing ends of the support structure 61. In the embodiment shown in FIGS. 10-14, where the patient is positioned in a "repositioning" configuration, the first side 62 of the support structure 61 extends towards the head portion of the device 20, while the second side 65 extends towards the foot portion of the device 20, such that the support structure 61 is parallel with the patient 70 laying on the device 20. The first side 62 of the support structure 61 comprises a central hook 63 and a plurality of side hooks 64 configured to receive straps of the device. In the embodiment shown in FIGS. 10-14, the central hook 63 extends from a central portion of the first side 62 such that it is parallel with the support structure 61. There are shown to be two side hooks 64, located on either side of the support structure 61. Other embodiments may have varying number of side hooks 64. In some embodiments, the components of the first side 62 are identical to the components of the second side 65. The second side 65 is shown to have a central hook 66 and a plurality of side hooks 67.

In the embodiment of FIG. 10-14, the straps 52*a*, 54, and 56 are attached to the hoist 60 in an arrangement conducive to the "repositioning" configuration. Each of the long upper support loops 52*a* are connected to a respective side hook 64 of the first side 62 of the support structure 61, such that one long upper support loop 52*a* attaches to a first side hook 64 and the second long upper support loop 52*a* attaches to a second side hook 64. Each central support strap 54 is also connected to a respective side hook 64 of the first side 62 of the support structure 61, such that one central support strap 54 attaches to the first side hook 64 and the second central support strap 54 attaches to the second side hook 64. Each of the lower support loops 56 is connected to a respective side hook 67 of the second side 65 of the support structure 61, such that one lower support loop 56 attaches to a first side hook 67 and the second lower support loop 56 attaches to a second side hook 67. The short upper support loops 52*b* are unused in this configuration, and may be allowed to hang freely from the device 20. The straps 52*a*, 54, and 56 extend from both sides of the device 20, acting to cradle the patient 70 when the straps 52*a*, 54, and 56 are attached to the hoist 60. In other embodiments, the connection and attachment of straps 52*a*, 54 and 56 may vary, such that the straps 52*a*, 54, and 56 may be attached to any of the hooks 63, 64, 66, 67.

Figure 14:
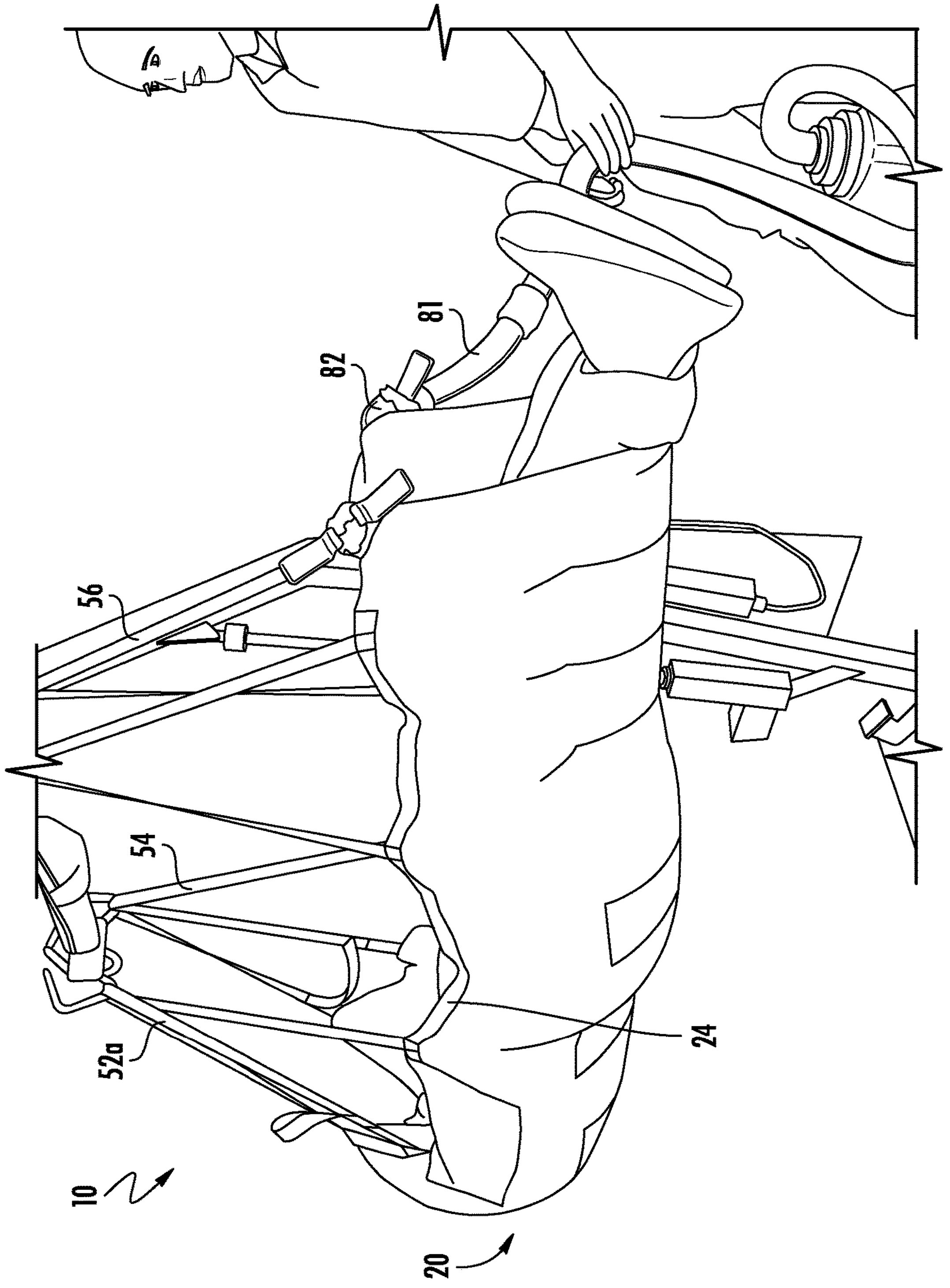
FIG. 14 is a perspective view of the hoist lifting the device of FIGS. 1-2.
Figure 15:
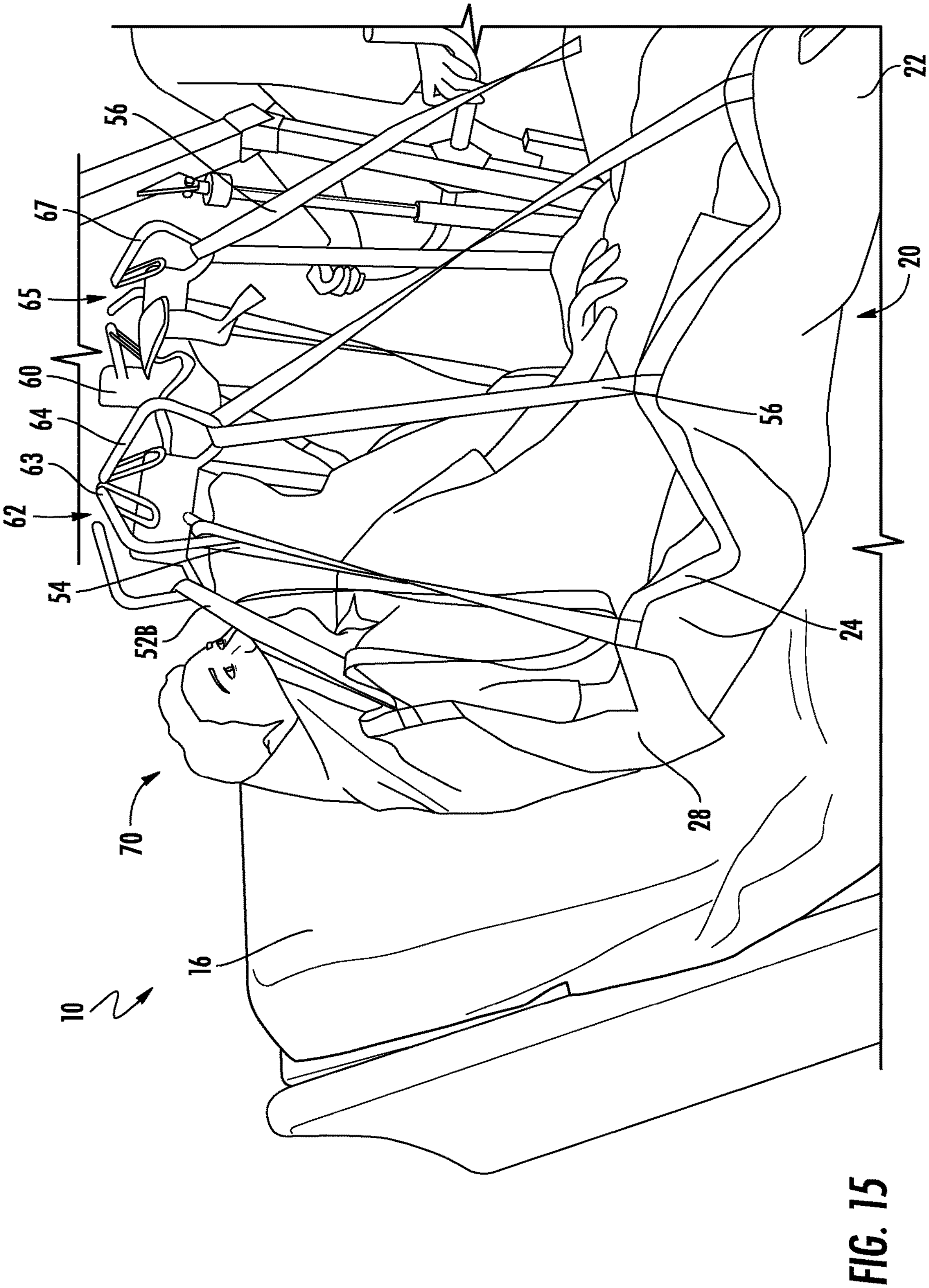
FIG. 15 is a perspective view of the device of FIG. 1-2 attached to the attachment mechanism of the hoist configured to lift a patient in a second arrangement.

Once all the straps 52*a*, 54 and 56 are connected to the support structure 61, the hoist 60 can be activated to raise the device 20 and the patient 70, as shown in FIGS. 12-14. The attachment of straps 52*a*, 54, and 56 as described in relation to FIGS. 10-14 causes the patient 70 to be raised in a relatively horizontal position, such that the device 20 and the patient 70 remain parallel with the ground. The long upper support straps 52*a* act to provide support to the patient's head, effectively cradling the patient's head as the side edges 23*c* of the device 20 fold inwards and upwards slightly. In this strap configuration, the patient 70 is gradually lifted using the hoist 60. The straps 52*a*, 54, and 56 have a particular length, such that upon connection to the support structure 61, the patient 70 is evenly lifted. In this way, the patient's upper body is lifted at the same upward rate as the patient's lower body. Once the patient 70 is raised using the hoist 60, the patient 70 can be moved easily by moving the hoist 60, which may have wheels (not shown) or other means of movement. When the patient 70 is desired to be lowered after moving, the hoist 60 can lower the patient 70 onto the supporting surface 16, returning to the position shown in FIG. 10. The straps 52*a*, 54, and 56 can then be disconnected from the hoist 60. The device 20 can remain under the patient 70 for long periods of time, and can remain inflated, or be inflated as needed, to assist with other positioning maneuvers. This enables the device 20 to be used in moving and repositioning the patient 70 throughout a long period of care, such as for repositioning the patient 70 on the supporting surface 16, and future lifting of the patient 70 using the hoist 60, among other options.

Figure 16:
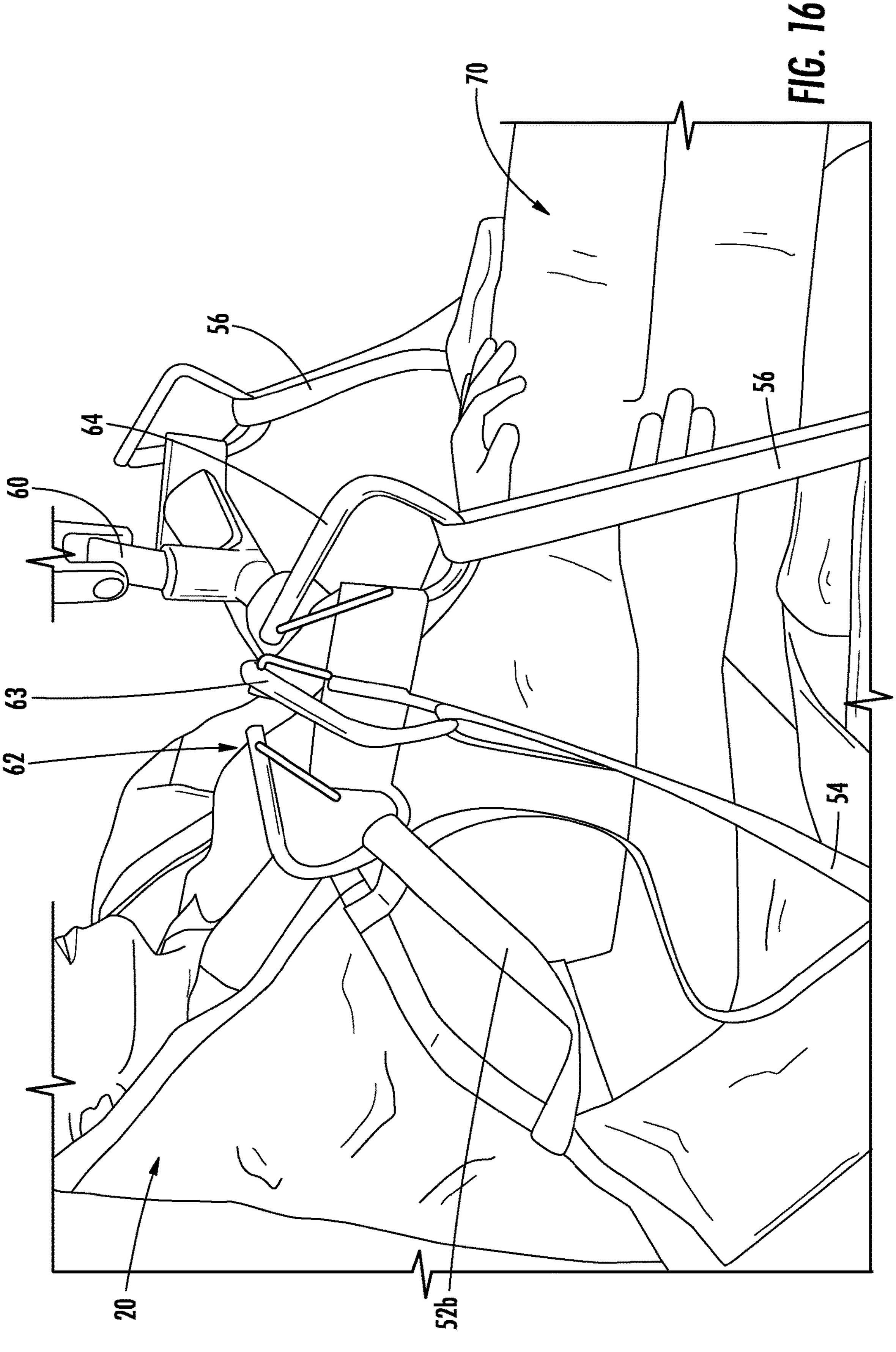
FIG. 16 is a magnified view of the attachment mechanism of the hoist of FIG. 13.
Figure 17:
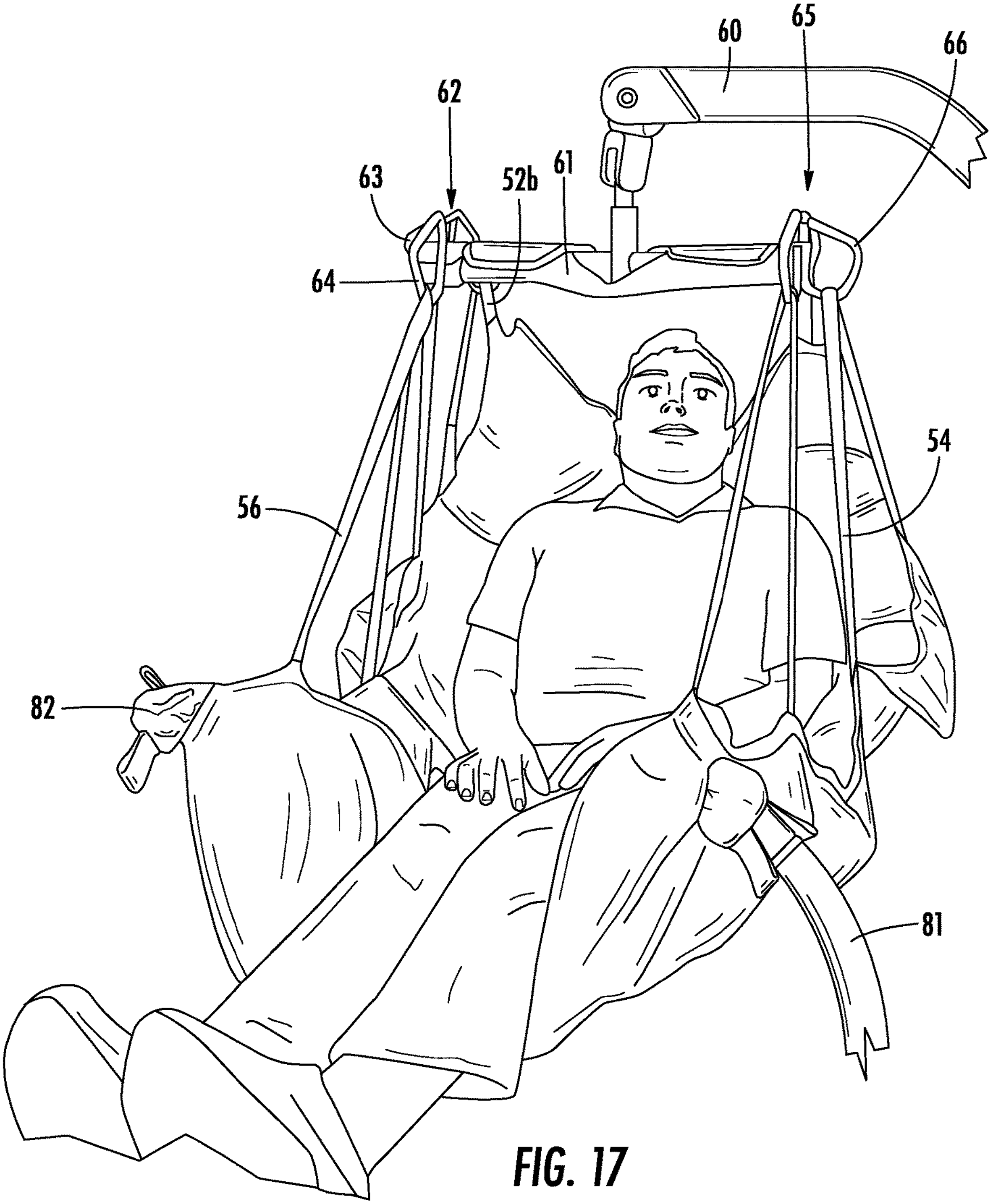
FIG. 17 is a perspective view of the hoist lifting inflatable device and the patient in the second arrangement.
Figure 18:
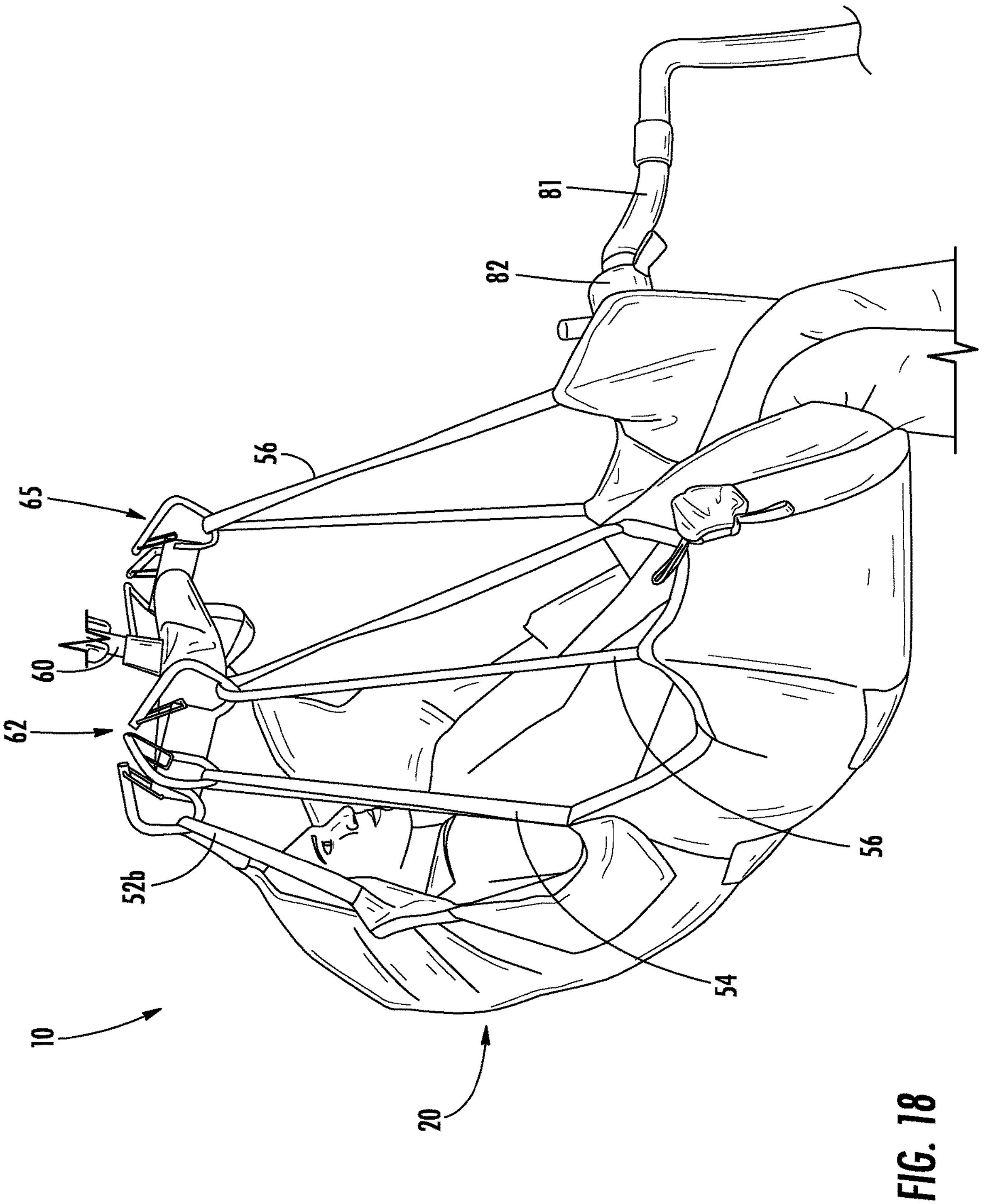
FIG. 18 is a perspective view of the hoist lifting inflatable device and the patient in the second arrangement.

In FIGS. 15-18, the device 20 is shown being used to lift the patient 70 using a hoist 60. In this arrangement, the patient is being lifted in a "universal" sling configuration. In the embodiment of FIGS. 15-18, the head of the support surface 16 is first raised, such that the upper body of the patient is elevated. The device 20 is then attached to the hoist 60 via the short upper support loops 52*b*, the central support straps 54, and the lower support loops 56. Such an attachment acts to cradle the patient 70 in a upright, or seated position. In the embodiment shown in FIGS. 15-18, the support structure 61 of the hoist 60 is rotated such that the support structure 61 is perpendicular to the patient 70 laying on the device 20. The device 20 is then attached to the hoist 60 using the short upper support loops 52*b*, the central support straps 54, and the lower support loops 56. In this configuration, the long upper support loops 52*a* are unused. The short upper support loops 52*b* are attached to the side hooks 64, 67 pointed towards the head of the device 20 on both the first side 62 and the second side 65 of the support structure 61. The central support straps 54 are each attached to the respective one of the central hooks 63, 66 on the first side 62 and the second side 65 of the support structure 61. The lower support loops 56 are attached to the side hooks 64, 67 pointed towards the foot of the device 20 on both the first side 62 and the second side 65 of the support structure 61. As the short upper support loops 52*b* are substantially shorter than the central support straps 54 and the lower support loops 56, this attachment configuration holds the patient 70 in a more upright, or seated position with the upper body raised. The hoist 60 may then be used to raise and transfer the patient 70 in this upright position, as seen in FIGS. 16-18, using the same mechanism as detailed earlier. Once the hoist 60 has moved the patient 70, the device 20 may be placed back onto the support structure or chair and deflated, if inflation was desired.

Figure 19:
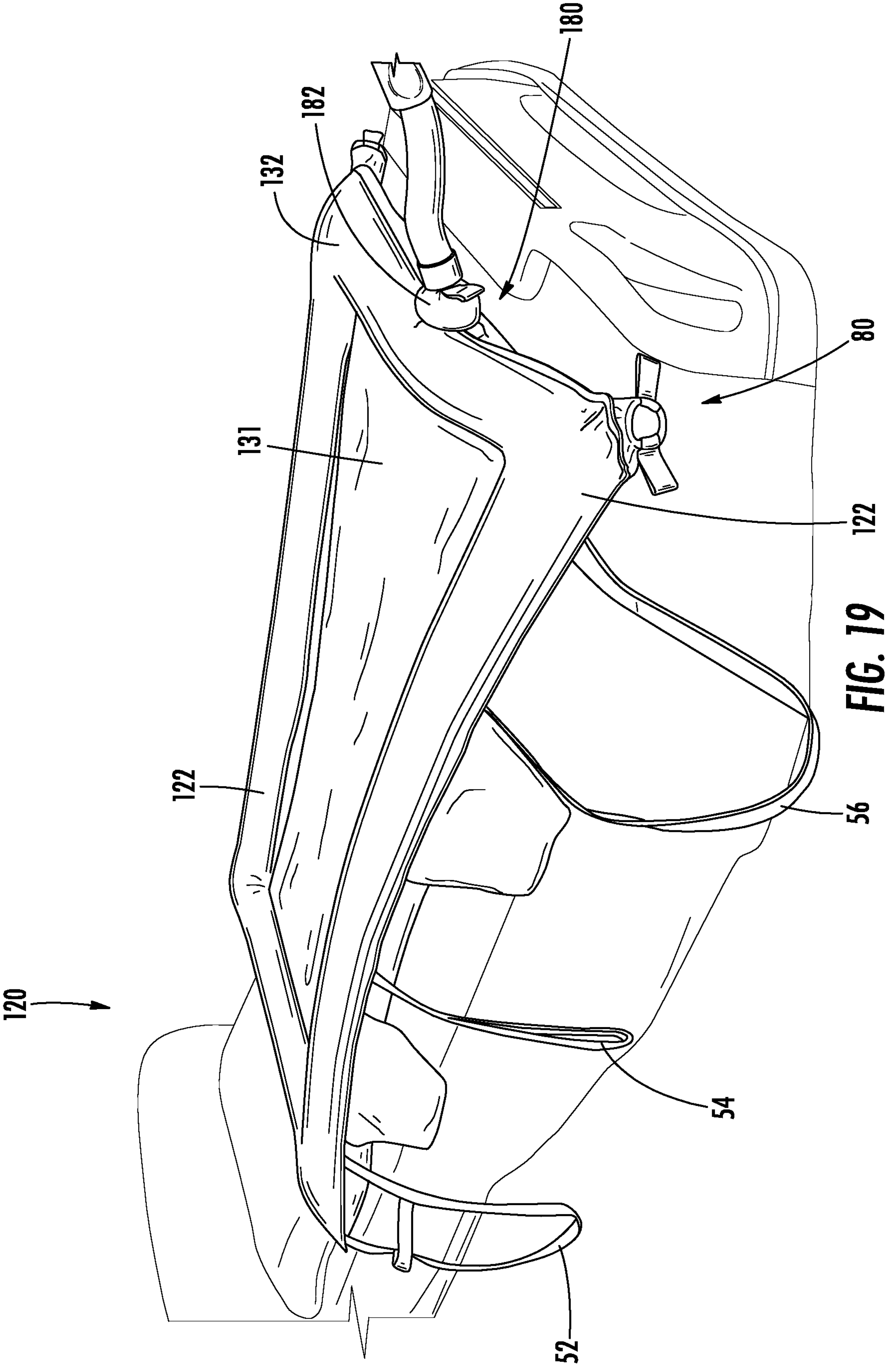
FIG. 19 is a top perspective view of a second embodiment of a device for use in lifting, moving, and positioning a patient, according to aspects of the disclosure.
Figure 20:
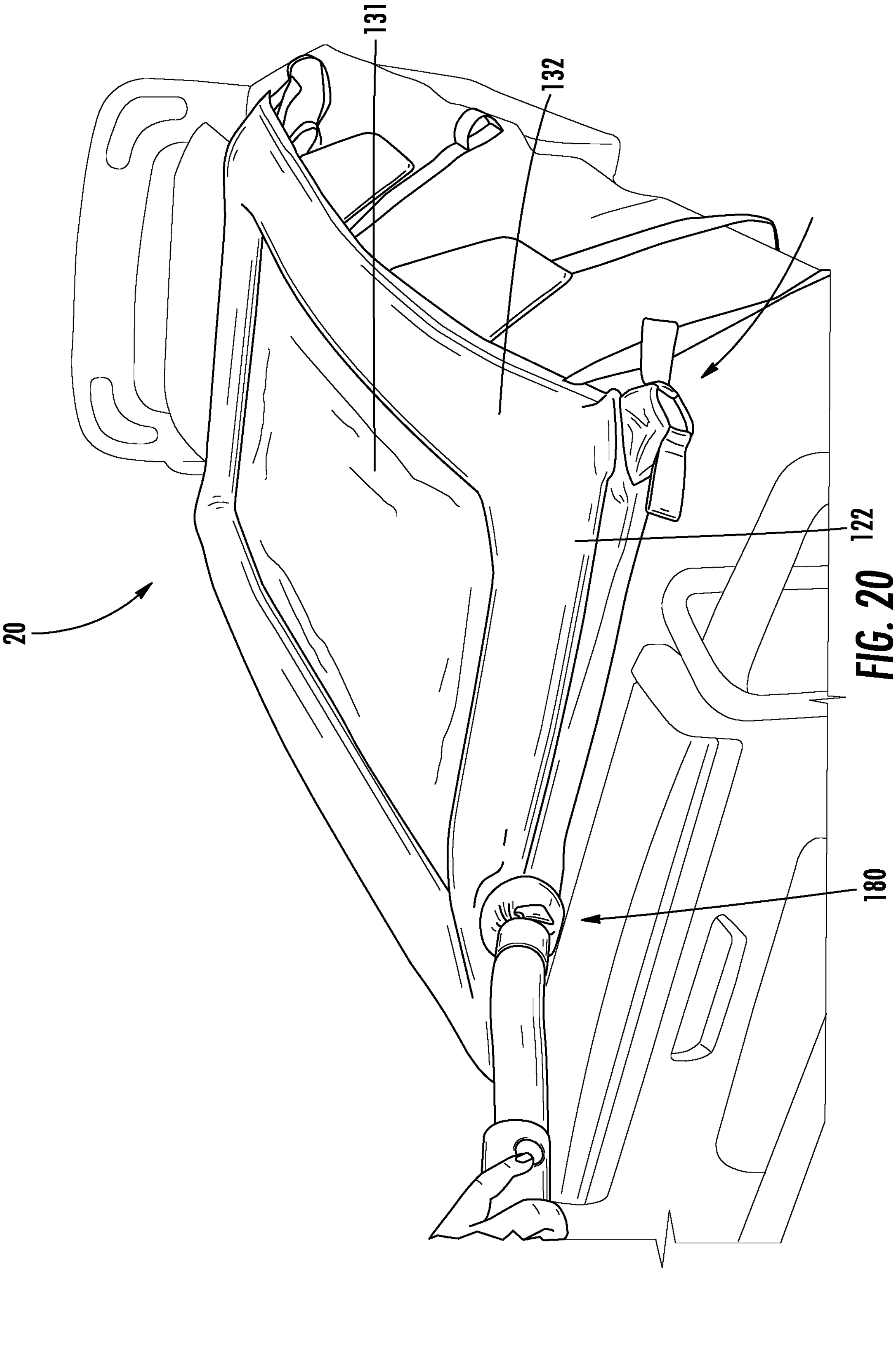
FIG. 20 is an alternative top perspective view of the device of FIG. 19.
Figure 21:
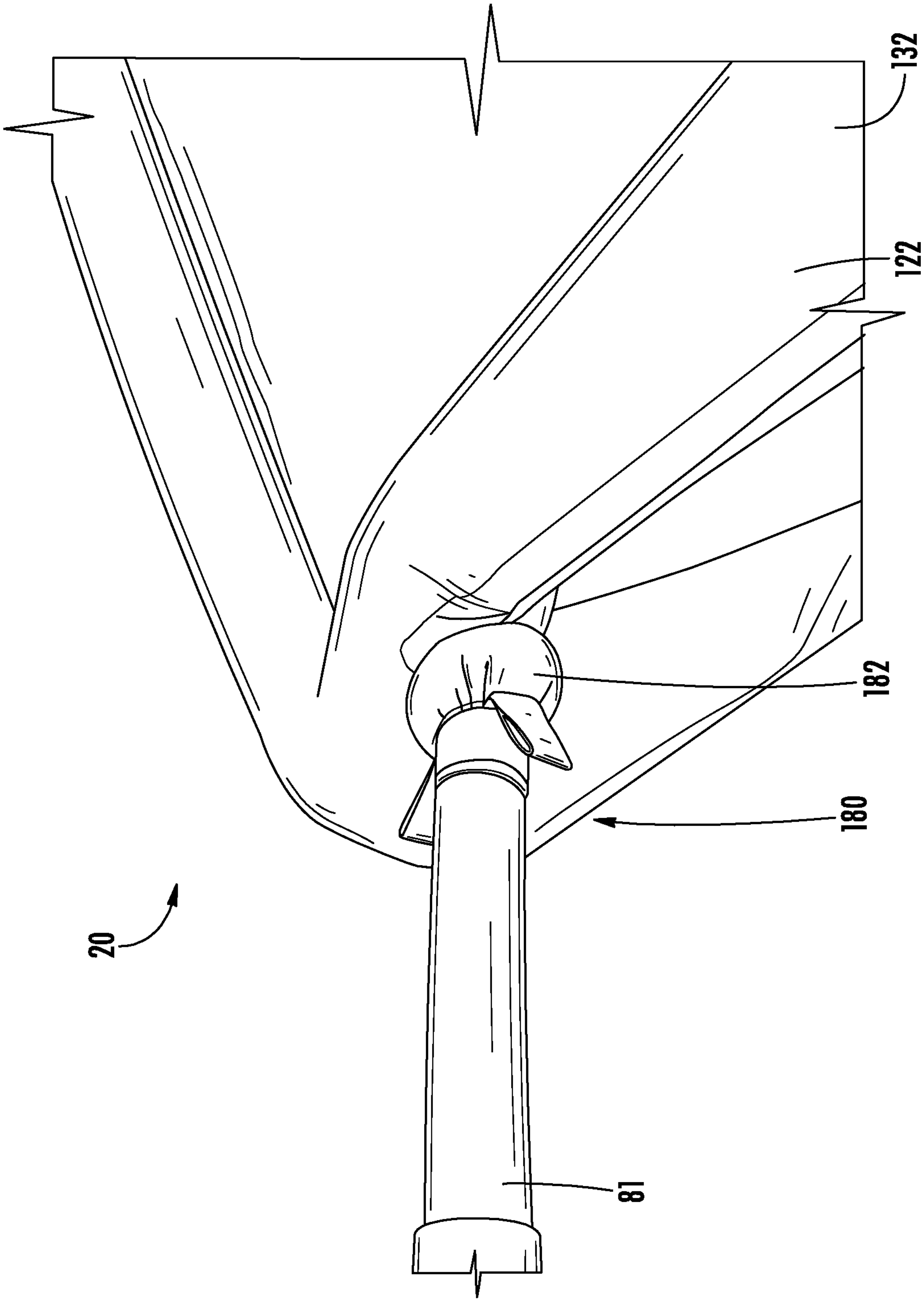
FIG. 21 is a magnified view of an inflation port of the device of FIG. 19.

Referring now to FIGS. 19-23, a second embodiment of a device for lifting a patient is shown. FIGS. 19 and 20 show top perspective views of device 120 for lifting and positioning a patient according to the present disclosure. As shown, device 120 includes (among the various other features similar to device 20 described above), a second cavity 132 forming a peripheral support 122 which is inflated about the periphery of the device 120. In the embodiment shown, the peripheral cushion extends around the entire periphery, but in other embodiments, extends along only the side edges, or a portion thereof. The peripheral support 122 is formed by filling with air a second cavity 132 that is separate from the first cavity 131 of the device. The device 120 includes a secondary inflation port 180 that is in fluid connection with the peripheral support 122, as shown in FIG. 21. In the embodiment shown, the inflation port 180 is a port sock 182 that is centrally positioned along the foot edge 123*b* of the device 120, but may be configured differently and/or positioned anywhere along the periphery or anywhere on the device 120 in other embodiments.

Figure 22:
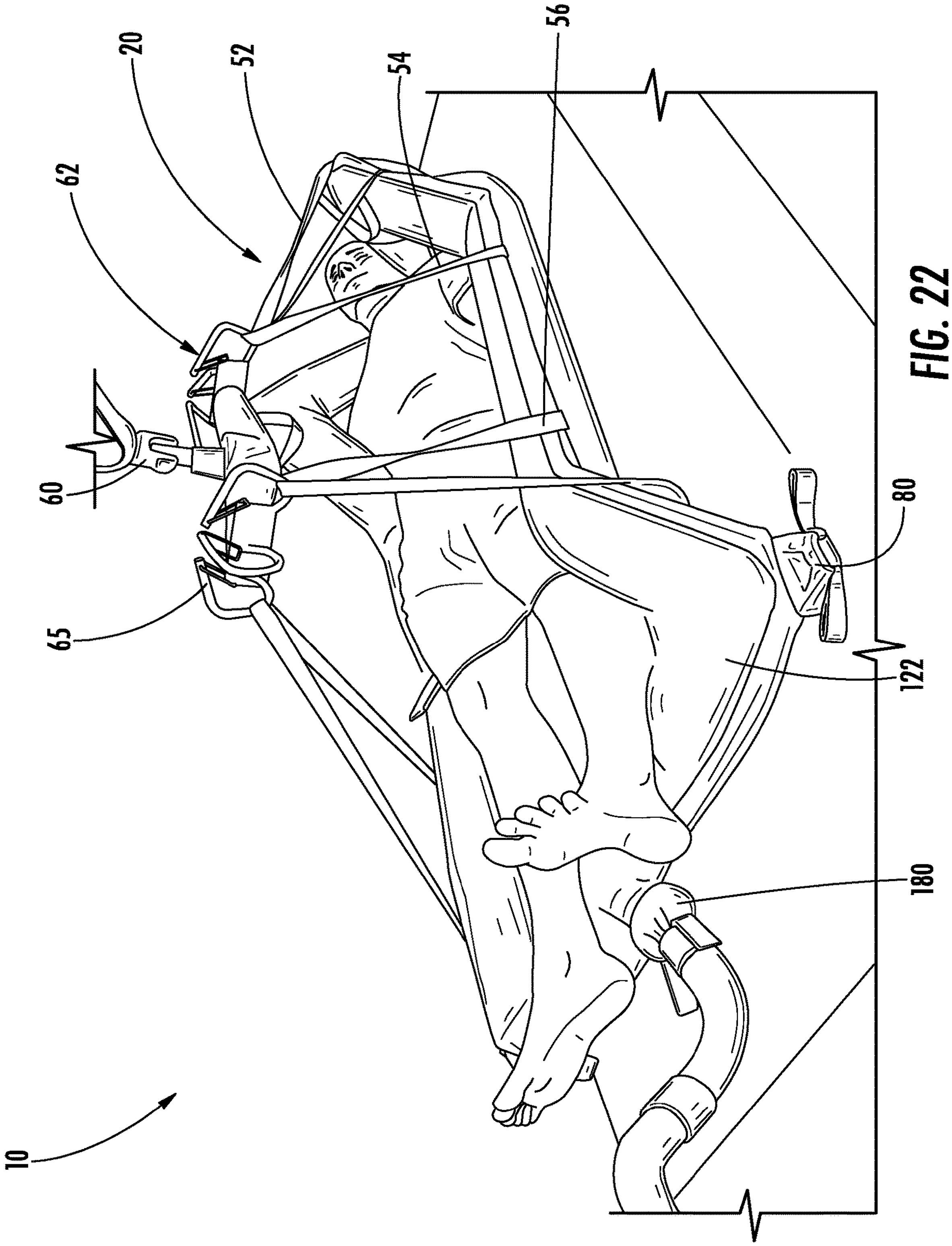
FIG. 22 is a perspective view of the hoist lifting the device of FIG. 19.
Figure 23:
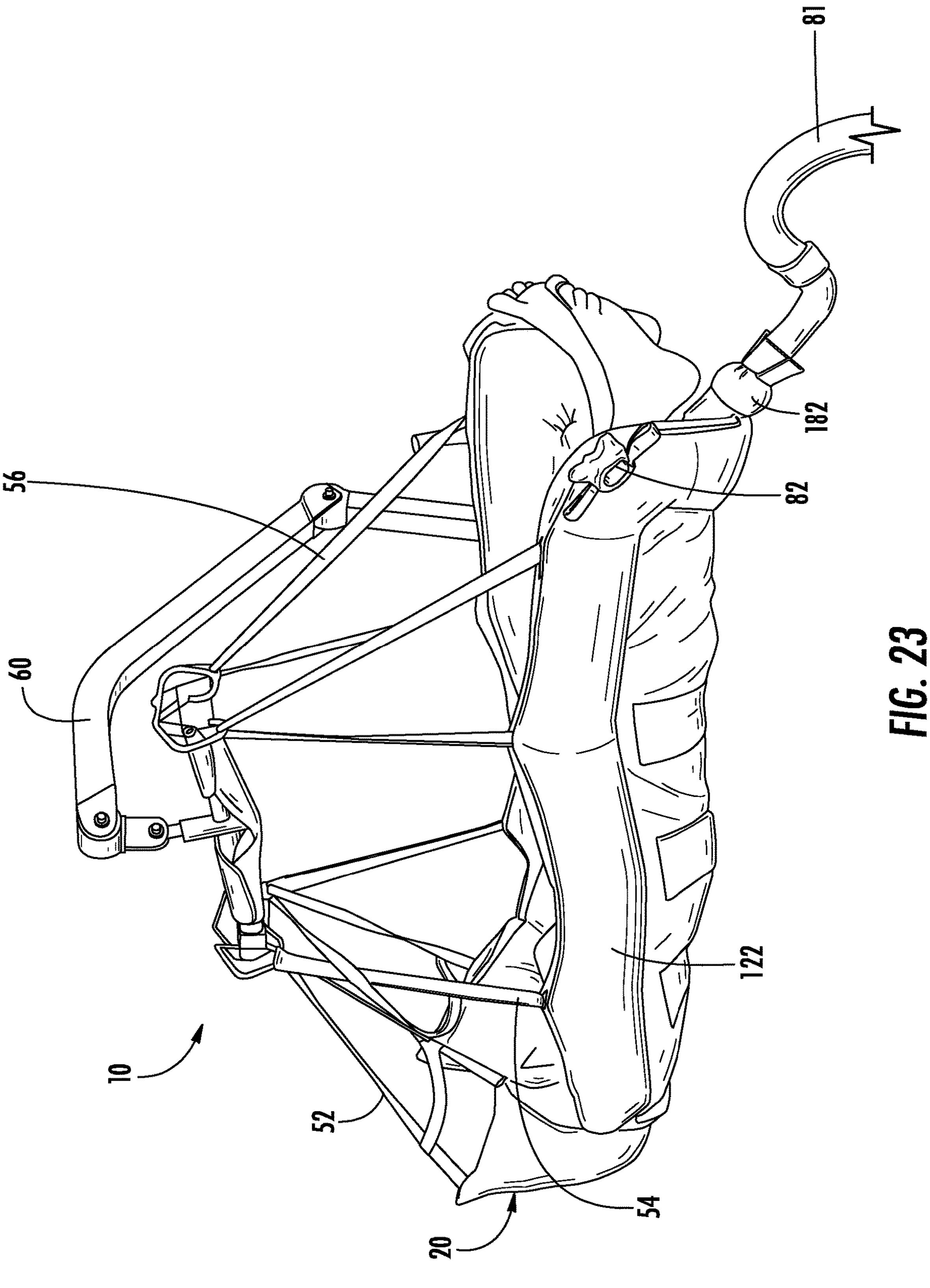
FIG. 23 is a side view of the hoist lifting the device of FIG. 19.

FIGS. 22 and 23 depict the patient being lifted by the device 120 and hoist 60. As shown in these figures, with the patient positioned on the device 120, the peripheral support 122 remains inflated while lifting the patient, while there is no air flow into cavity 131 to cause inflation thereof. In this embodiment utilizing a peripheral cushion, a smaller percentage of the patient's body is in contact with the area of the device 120 being inflated by air flow from the air source 81, which may experience a temperature increase. Particularly, this embodiment is designed such that 10% or less of the patient's total body surface is in contact with the inflated portion of the device, i.e., the peripheral support 122, while positioned on the device 120.

In a similar fashion, other embodiments may incorporate a different arrangement of a secondary cavity or cavities separate from cavity 31/131 that result in a lower percentage of total body surface contact (i.e., 10% or less). For example, there may be one or more elongated cavities that extend laterally on the device, partially or completely between the side edges 123*c*. Also, as mentioned above, the peripheral support 122 may not extend the entire periphery of the device 120, but rather, may have discreet sections that extend along select sections of any of the peripheral edges 123 of the device.

In yet another embodiment, shown in the exploded view of FIG. 24, a secondary cavity 232, separate from but similarly sized and arranged as cavity 231, is formed within the body of the device 220 which can be inflated with air, but that is configured to remain inflated even when air flow into the cavity is reduced and/or stopped. In this embodiment, the secondary cavity 232 is formed between the top sheet 26 and an additional top sheet 126. The top sheet 26, additional top sheet 126, and bottom sheet 27 are coupled around the peripheral edges 23 of the device in any manner as described above. The secondary cavity may include a separate inflation port (not shown) and does not include any passages which allow for the passage of air from the cavity 232 to the outside of the device. In this embodiment, the top sheet 26 and additional top sheet 126 contain air within the secondary cavity 232 and do not allow the air to escape through the passages 37.

Figure 25:
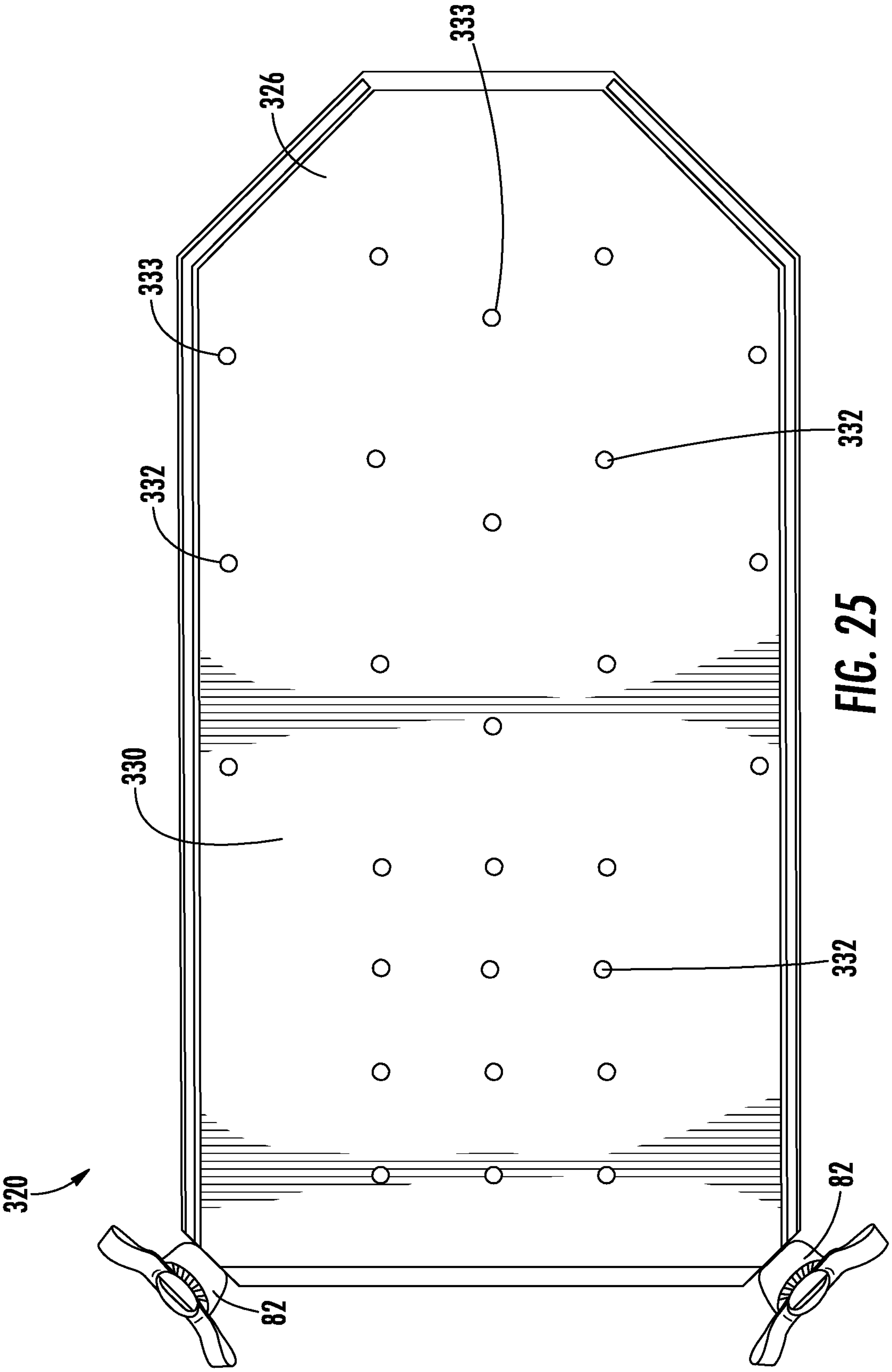
FIG. 25 is a top view of a device that may be used in combination with aspects of the present disclosure and/or configured for use in lifting, moving, and positioning a patient, according to aspects of the disclosure.
Figure 26:
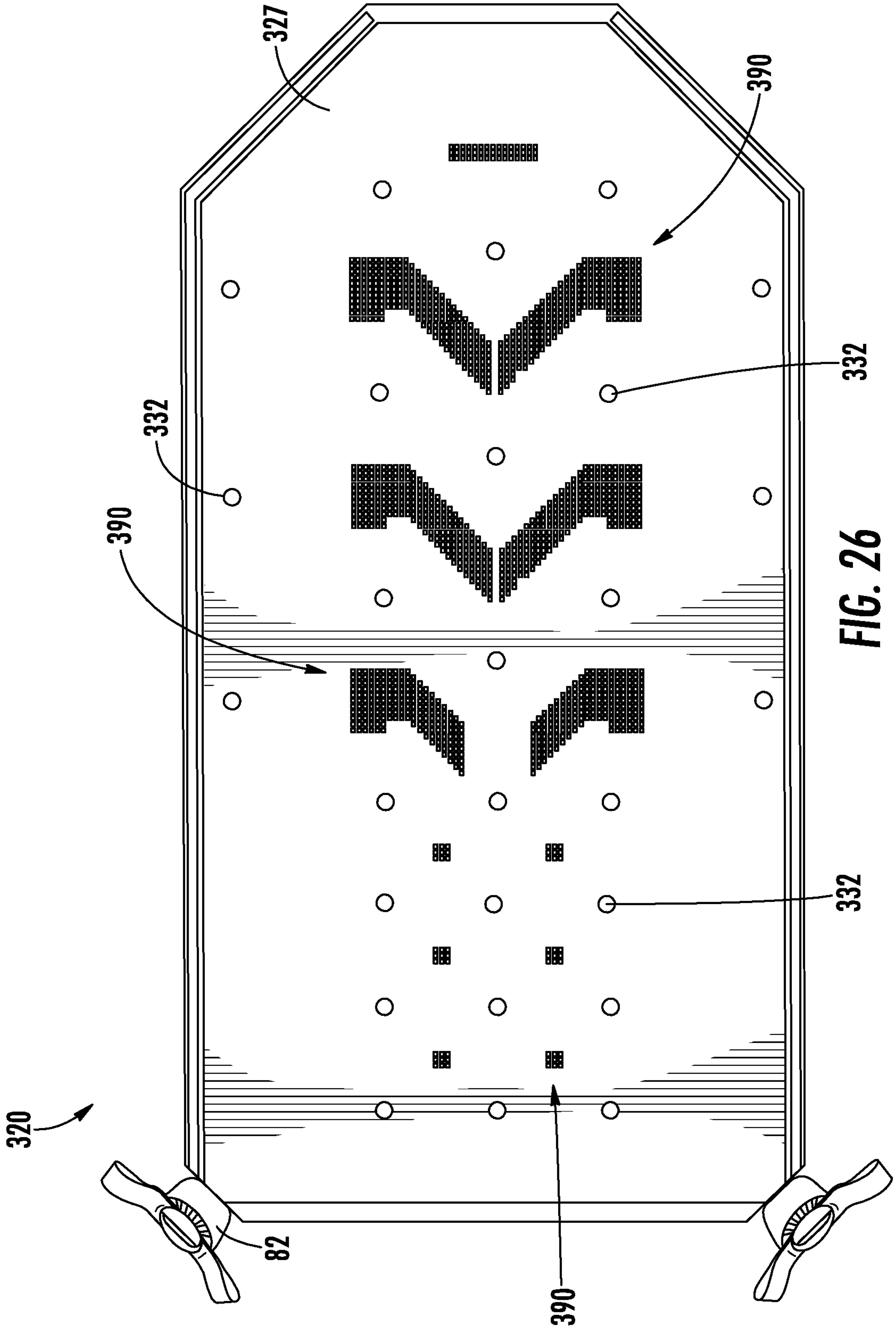
FIG. 26 is a bottom view of the device of FIG. 25 according to a first embodiment.
Figure 27:
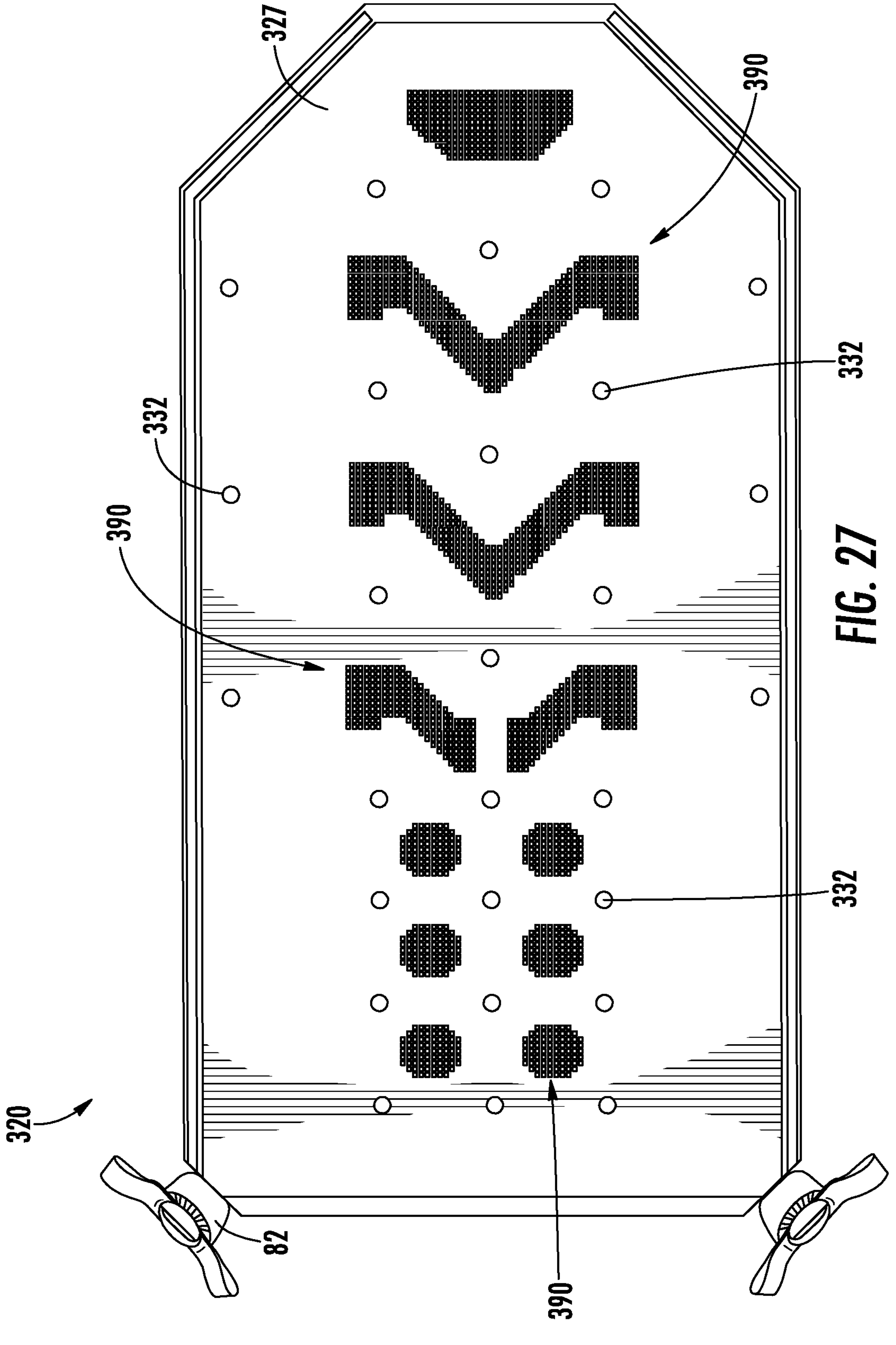
FIG. 27 is a bottom view of the device of FIG. 25 according to a second embodiment.

While the additional top sheet 126 is shown in connection with the device 20 described previously, it is contemplated that an additional top sheet 126 may be included with other variations of the device, such as the device 320 shown in FIGS. 25-27 which include different forms of inflation limiting members and air passages. In the embodiment illustrated in FIGS. 24-25, the inflatable body 330 has a plurality of connection areas 332 between the top sheet 326 and the bottom sheet 327 to form inflation-limiting structures, and in the embodiment forming a secondary cavity, the connection areas 332 connect the additional top sheet as well. The connection areas 332 in this embodiment are circular in shape and are formed by stitching the top and bottom sheets 326, 327 (and may include the additional top sheet) together by stitches 333 arranged a circular shape in a plurality of locations. In some embodiments, the sheets are stitched together by stitches 333 arranged in two or more concentric circles for reinforcement and strength of the connection area 332. In some embodiments, the stitches 333 of a connection area 332 are arranged in three concentric circles. Stitching in three concentric circles provides the added benefit of decreasing the volume of air capable of residing within the circular stitch which could lead to stitch failure, and also minimizes the air flow through the stitch holes.

Referring to FIGS. 26 and 27, the device 320 includes a plurality of passages 390 in the bottom sheet 327 that permit air to pass from the cavity to the exterior of the inflatable device 320. The passages 390 extend from the cavity through the bottom sheet 327 to the exterior of the inflatable device 320. In various embodiments, the passages 390 have a diameter in the range of 0.6 mm to 1.2 mm, or any range there between. In some embodiments, the passages 390 have a diameter in the range of 0.75 mm to 1.05 mm, or any range there between. In some embodiments, the passages 390 have a diameter of approximately 0.9 mm. In some embodiments, the passages 390 have a diameter of approximately 1.0 mm. The diameter of the passages impacts, at least partly, the effectiveness of the device 320 for maneuvering a patient. For example, if the passages 390 are too small, they may not allow enough air to pass through and will not be effective in decreasing the friction between the bottom surface and the surface upon which it sits. On the other hand, if the passages are too large, too much air will pass through and the device 320 will partially or wholly deflate, also minimizing the effectiveness of the device 320.

As stated above, the passages 390 of the device 320 are intended to pass air between the bottom surface of the device 320 and the support surface 16 upon which the device 320 sits. The effectiveness of these passages 390 in doing so is also impacted by the arrangement of the passages 390 in the bottom sheet 327. FIGS. 25 and 26 show two exemplary embodiments. Generally, the passages 390 are arranged entirely, or more densely, in areas of the bottom sheet 327 that are in contact areas, where the bottom sheet 327 contacts the support surface 16 when the device 320 is inflated and supporting a patient. The device 320 may also have non-contact areas. In particular, when the device 320 is inflated, the connection areas 332 and the areas surrounding them are drawn in towards the cavity when inflated (due to the top sheet 326 and bottom sheet 327 being sewn together in these areas) and the bottom sheet 327 in these areas does not contact the surface. Accordingly, passages 390 positioned in this area would not be as effective for the intended purpose. Thus, it is preferred that all or most of the passages 390 are arranged in areas in between and spaced at a distance from the connection areas 332, which are the areas that are in contact with the surface when the device is inflated and supporting a patient. Device 320 may be configured as shown and described in U.S. patent application Ser. No. 16/007,712 entitled "Patient Positioning and Support System" and filed Jun. 13, 2018, or in U.S. Patent Publication No. 2017/0326011 entitled "Patient Transport Apparatus" and filed May 12, 2017, each of which is hereby incorporated by reference herein in its entirety.

It is understood that the other embodiments shown and described herein, e.g., as in FIGS. 1-18, 19-23, 24, and 25-27, may be utilized in the same or a similar method, with the same or similar functionality. Elements that are present in the alternative embodiments have not been described a second time with respect to FIGS. 19-23, 24, and 25-27 and are contemplated as having the same functionality as described above with respect to FIGS. 1-18. Furthermore, the device shown in FIGS. 19-23, 24, and 25-27 are also contemplated as being configured to be lifted by the hoist in a similar fashion as the device according to the first embodiment, as described particularly with respect to FIGS. 10-14. It is also understood that any embodiments of the device could be used in conjunction with the hoist without any inflation.

As described above, the device 20 may be configured for attachment to a hoist 60 in a variety of different configurations. The device 20 may first be inflated via the sock port 82 using an air source 81, and then transferred via the hoist 60. After transfer of the patient 70 and the device 20 using hoist 60, the device 20 may be deflated by simply shutting off and/or removing the air source 81. As described above, in some embodiments, the device 20 is configured to remain inflated after the air source 81 has been disconnected from the device 20 or airflow has been reduced, such that the device 20 can be used to lift and move the patient in an inflated state without the continued flow of air into the device 20.

According to various embodiments disclosed herein, the devices 20, 120, 220, 320 are designed and configured for single-use. In other words, the devices are intended to be disposed of after each use. As such, the devices do not have to be cleaned or repaired after use, and are instead able to be replaced with a fresh device as needed. Among other reasons, sanitary benefits are achieved by disposing of used products and replacing them with new ones. In view thereof, some embodiments include a label affixed to the device which identifies the product as a single-use device and provide notice to the user not to re-use the device. In some embodiments, the label changes its form or text when it has been washed, for example due to water submersion, temperature change, such as heating, the use of a detergent, soap, or other cleaning or chemical agents, or some combination thereof. For example, after washing, the label may warn the user that the device has been used and should be disposed. In some embodiments, the label includes a first and a second layer. The first, outermost layer may be dissolvable and will dissolve when the device is washed. In such embodiments, the first layer may identify the product as single-use or may include a notice to the user not to wash the device. The first layer may be a water-soluble paper or polymer. After the first layer dissolves, a second layer remains and is visible which warns the user that the device has been used and should be disposed. In some embodiments, the second layer is a portion of a surface of the device which is only exposed once the first, outermost layer has dissolved.

In other embodiments, the devices 20, 120, 220, 320 and any of the components thereof may be refurbished for reuse. Refurbishment of the device may include steps such as inspecting the device, removing foreign particles, stains, or odors by washing one or more surfaces of the device, repairing tears or damage to the device, repairing or supplementing the stitching, such as at the seams, loops, or straps, replacing any elements or components, including loops or straps, replacing missing items from a kit, etc. Refurbishing may include decontaminating the system and/or any of the components such as by sterilization means, such as the use of gamma radiation, electron-beam radiation, X-ray radiation, Ethylene oxide (EtO), steam, such as through the use of an autoclave, or any combination thereof. And, refurbishing may include repackaging the system and elements thereof and providing all or any part of the system to a customer through a sale or leasing arrangement.

The use of the system 10 and methods described above can decrease the number of pressure ulcers in patients significantly by assisting with repositioning and transfer of patients, while assisting caregivers in these maneuvers to prevent or minimize injury.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the systems, devices, and methods described herein may be embodied in other specific forms without departing from the spirit or central characteristics thereof. The present examples and embodiments, therefore, are to be considered in all respects as illustrative and not restrictive, and the invention is not to be limited to the details given herein. The terms "first," "second," "top," "bottom," etc., as used herein, are intended for illustrative purposes only and do not limit the embodiments in any way. In particular, these terms do not imply any order or position of the components modified by such terms. Additionally, the term "plurality," as used herein, indicates any number greater than one, either disjunctively or conjunctively, as necessary, up to an infinite number. Further, "providing" an article or apparatus, as used herein, refers broadly to making the article available or accessible for future actions to be performed on the article, and does not connote that the party providing the article has manufactured, produced, or supplied the article or that the party providing the article has ownership or control of the article. Accordingly, while specific embodiments have been illustrated and described, numerous modifications come to mind without significantly departing from the spirit of the invention.

What is claimed is:

1. An inflatable device for lifting a patient, the inflatable device comprising:

an inflatable body having a top edge, a first side edge contiguous with the top edge, and a second side edge contiguous with the top edge, the top edge extending between the first side edge and the second side edge, the inflatable body comprising:

a top sheet, and a bottom sheet, wherein the top sheet and the bottom sheet are attached along peripheral edges and forming at least one cavity therebetween, the bottom sheet comprising a passage extending from the at least one cavity to an exterior of the inflatable body; and an anchoring strap extending along the first side edge, the top edge, and the second side edge;

a first flap extending outwardly from the first side edge and comprising a first handle;

a second flap extending outwardly from the first side edge, the second flap comprising a second handle; and a plurality of connecting members, each of the plurality of connecting members configured to be attached to a hoist, the plurality of connecting members comprising:

a first outer support loop extending from the first side edge and having a first end and a second end, the first end coupled to the anchoring strap at a first location along the first side edge and the second end coupled to the anchoring strap at a second location along the first side edge, an inner support loop having a third end and a fourth end, the third end coupled to the first outer support loop at a third location and the fourth end coupled to the first outer support loop at a fourth location, and a second outer support loop extending from the first side edge and having a fifth end and a sixth end, the fifth end coupled to the anchoring strap at a fifth location and the sixth end coupled to the anchoring strap at a sixth location, the sixth location positioned along a perimeter of the first flap; and wherein the second flap is positioned between the first outer support loop and the second outer support loop to facilitate repositioning of the inflatable device when the inflatable device lifted above a support surface through use of at least one of the plurality of connecting members.

2. The inflatable device of claim 1, wherein the plurality of connecting members are connected to the inflatable body only at one of the first side edge or the second side edge.

3. The inflatable device of claim 1, wherein at least one of the plurality of connecting members is a support loop that extends outwardly from one of the first side edge or the second side edge at two locations.

4. The inflatable device of claim 3, further comprising at least one additional connecting member coupled to the support loop to form a second support loop having a different length.

5. The inflatable device of claim 1, wherein at least one of the plurality of connecting members is a support strap that extends outwardly from one of the first side edge or the second side edge at only one location.

6. The inflatable device of claim 1, wherein attaching a first combination of the plurality of connecting members allows for lifting the patient in a first configuration.

7. The inflatable device of claim 6, wherein attaching a second combination of the plurality of connecting members to the hoist allows for lifting the patient in a second configuration.

8. The inflatable device of claim 1, further comprising a second inflatable cavity, separately inflatable from the at least one cavity of the inflatable body.

9. The inflatable device of claim 8, wherein the second inflatable cavity forms a peripheral cushion along at least two sides of the inflatable device.

10. The inflatable device of claim 8, wherein the second inflatable cavity is configured such that 10% or less of a total body surface of the patient is in contact with the second inflatable cavity of the inflatable device when the second inflatable cavity is in an inflated configuration.

11. The inflatable device of claim 8, further comprising a port in fluid communication with the at least one cavity and the exterior of the inflatable body, the port comprising:
- an elastic retaining mechanism defining an opening of the port;
- a side handle extending outwardly from the elastic retaining mechanism; and
- a side pouch positioned between the elastic retaining mechanism and an outer edge of the second inflatable cavity, the side pouch having a diameter greater than that of the elastic retaining mechanism.

12. The inflatable device of claim 1, further comprising a plurality of passages in the bottom sheet.

13. The inflatable device of claim 1, further comprising a cover coupled to the bottom sheet and covering the passage, the cover formed of an air-permeable, directional stitching material which resists movement of the inflatable device in a direction parallel to at least one longest peripheral edge of the peripheral edges.

14. The inflatable device of claim 13, the inflatable body further comprising a gusset coupled to the top sheet and the bottom sheet and extending across the at least one cavity.

15. The inflatable device of claim 14, wherein the gusset forms at least a portion of the cover that covers the passage.

16. The inflatable device of claim 13, wherein the cover allows air to pass from the at least one cavity to the exterior of the inflatable body through the passage to reduce friction between the inflatable device and the support surface.

17. The inflatable device of claim 1, wherein a first connecting member of the plurality of connecting members extends outwardly from a central portion of the first side edge at a single location and forms a loop at a distal end of the first connecting member.

18. The inflatable device of claim 17, wherein a second connecting member of the plurality of connecting members extends outwardly from a lower portion of the first side edge at two locations and forms a single loop.

19. A system for lifting a patient, the system comprising;
- the inflatable device of claim 1; and
- a support structure comprising:
  - a plurality of side hooks, and
  - a central hook.

20. The system of claim 19, the inflatable device further comprising a first connecting member of the plurality of connecting members, the first connecting member including a loop at a distal end of the first connecting member, the loop coupled to the central hook of the support structure.

* * * * *